United States Patent [19]

Saegusa et al.

[11] Patent Number: 5,305,050
[45] Date of Patent: Apr. 19, 1994

[54] CAMERA CAPABLE OF SLOW SYNCHRO PHOTOGRAPHING

[75] Inventors: Takashi Saegusa; Masaharu Hara, both of Kawasaki, Japan

[73] Assignee: Nikon Corporation, Tokyo, Japan

[21] Appl. No.: 751,342

[22] Filed: Aug. 28, 1991

[30] Foreign Application Priority Data

Aug. 30, 1990 [JP] Japan .................. 2-90997[U]
Sep. 4, 1990 [JP] Japan .................. 2-92475[U]
Sep. 25, 1990 [JP] Japan .................. 2-99037[U]

[51] Int. Cl.$^5$ .................. G03B 7/00; G03B 17/18; G03B 15/03
[52] U.S. Cl. .................. 354/420; 354/475; 354/146; 354/147
[58] Field of Search ........ 354/420, 422, 442, 471–475, 354/412, 400, 137, 138, 146, 147

[56] References Cited

U.S. PATENT DOCUMENTS

| | | | |
|---|---|---|---|
| 4,717,934 | 1/1988 | Kobayashi et al. | 354/472 X |
| 4,933,702 | 6/1990 | Komatsuzaki et al. | 354/420 X |
| 5,023,648 | 6/1991 | Meguro et al. | 354/420 |
| 5,117,250 | 5/1992 | Fujino et al. | 354/400 |

FOREIGN PATENT DOCUMENTS 1-295238 11/1989 Japan .

Primary Examiner—Michael L. Gellner
Assistant Examiner—Jae N. Noh
Attorney, Agent, or Firm—Shapiro and Shapiro

[57] ABSTRACT

A camera capable of slow synchro photographing comprises a shutter speed setting mode changeover device for changing over a shutter speed manual setting mode and a shutter speed auto setting mode; a shutter speed restricting device for performing a restriction during the shutter speed auto setting mode to set the shutter speed lower than a slowest shutter speed, i.e., a hand deflection limit shutter speed within a shutter speed range enough not to cause a hand deflection but performing no restriction during the shutter speed manual setting mode; a synchro mode changeover device for changing over a normal synchro mode for working the shutter speed restricting device and a slow synchro mode for releasing the restriction of the shutter speed by inhibiting the shutter speed restricting device from working in accordance with the manual operations; and an indication device for effecting a slow synchro indication for showing that the slow synchro mode is set by the synchro mode changeover device; and an indication control device which permits the indication device to perform the slow synchro indication when a changeover operation to the slow synchro mode is applied to the synchro mode changeover device during the shutter speed auto setting mode but inhibits the indication device from effecting the slow synchro indication even when the changeover operation to the slow synchro mode is applied to the synchro mode changeover device during the shutter speed manual setting mode.

10 Claims, 18 Drawing Sheets

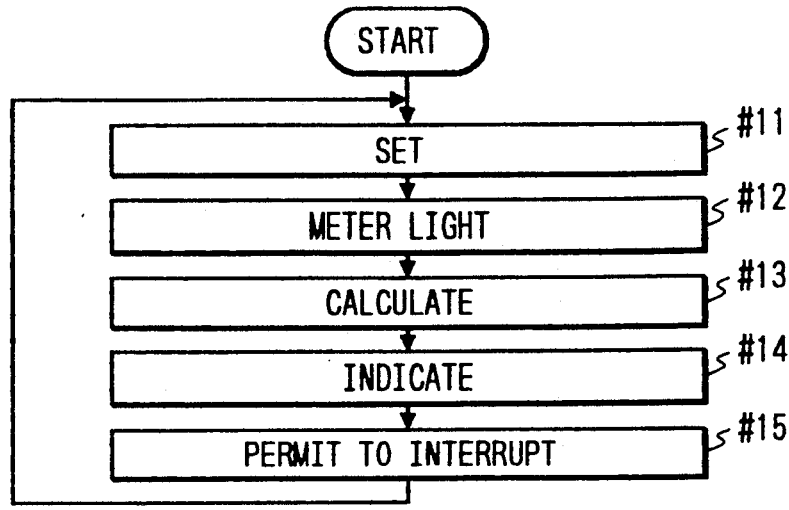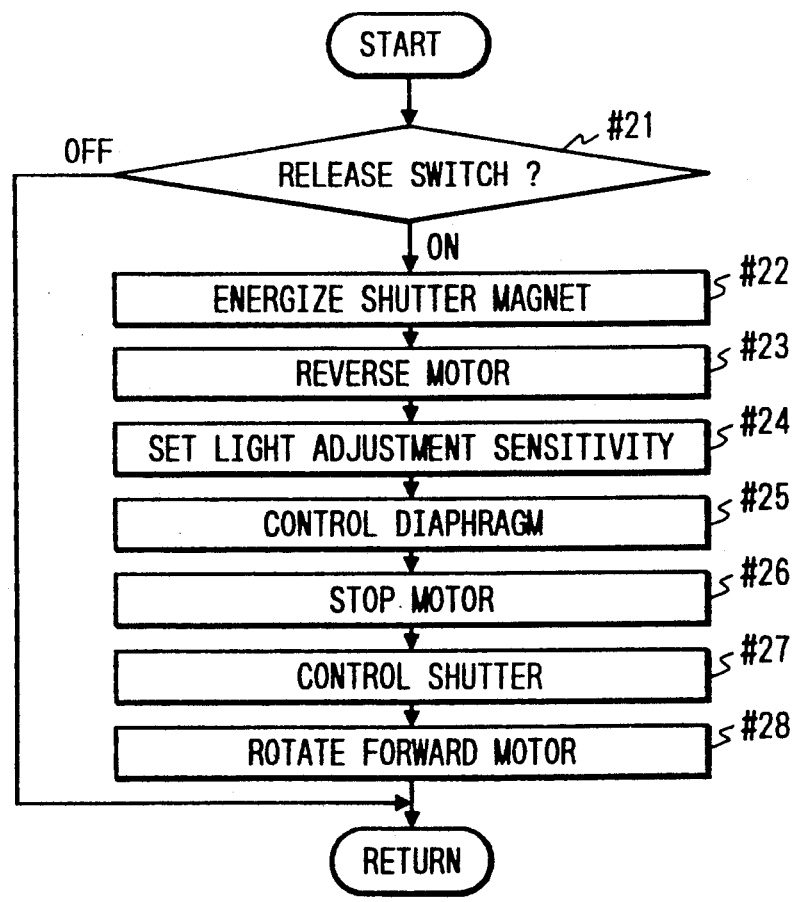

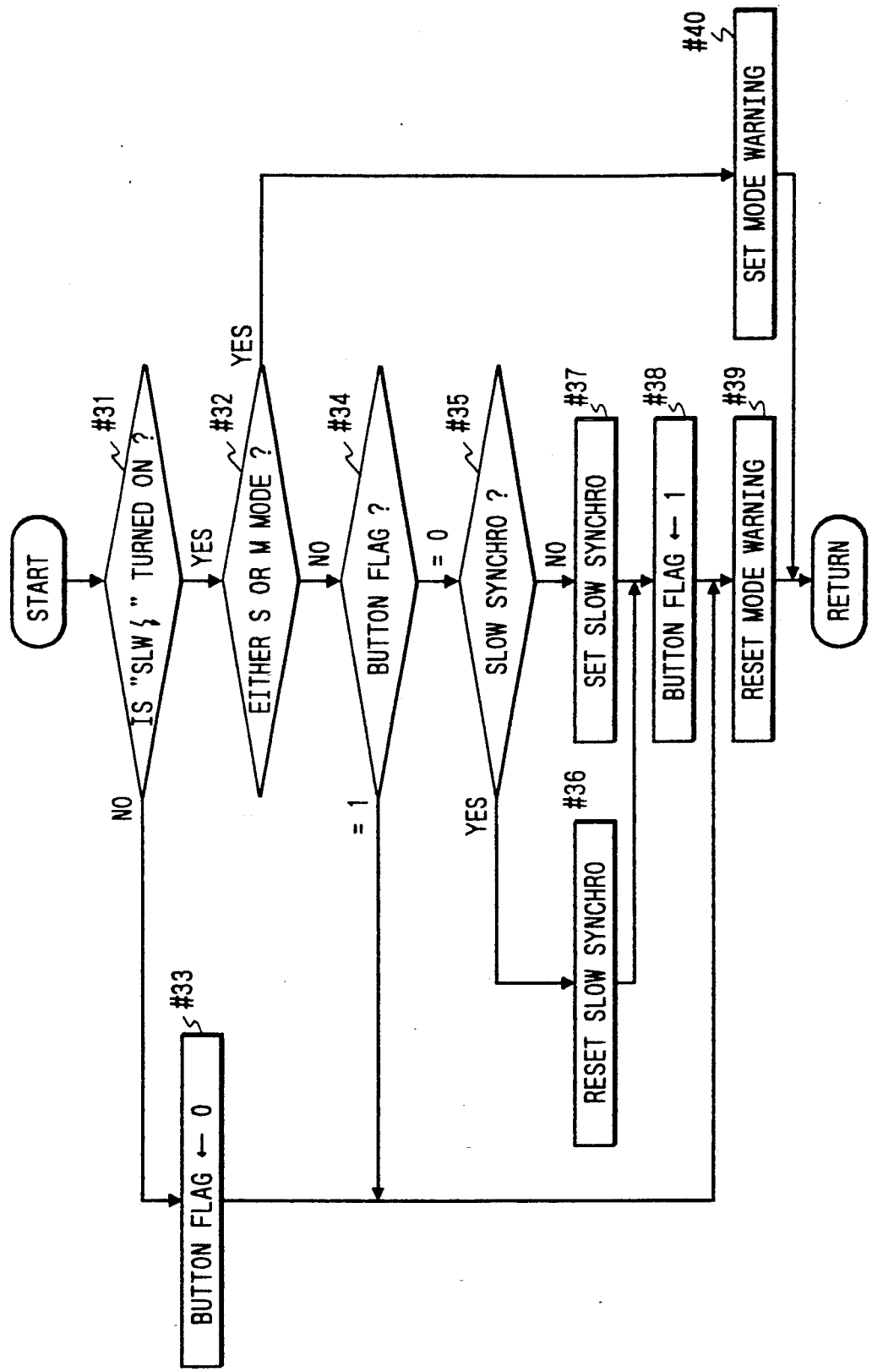

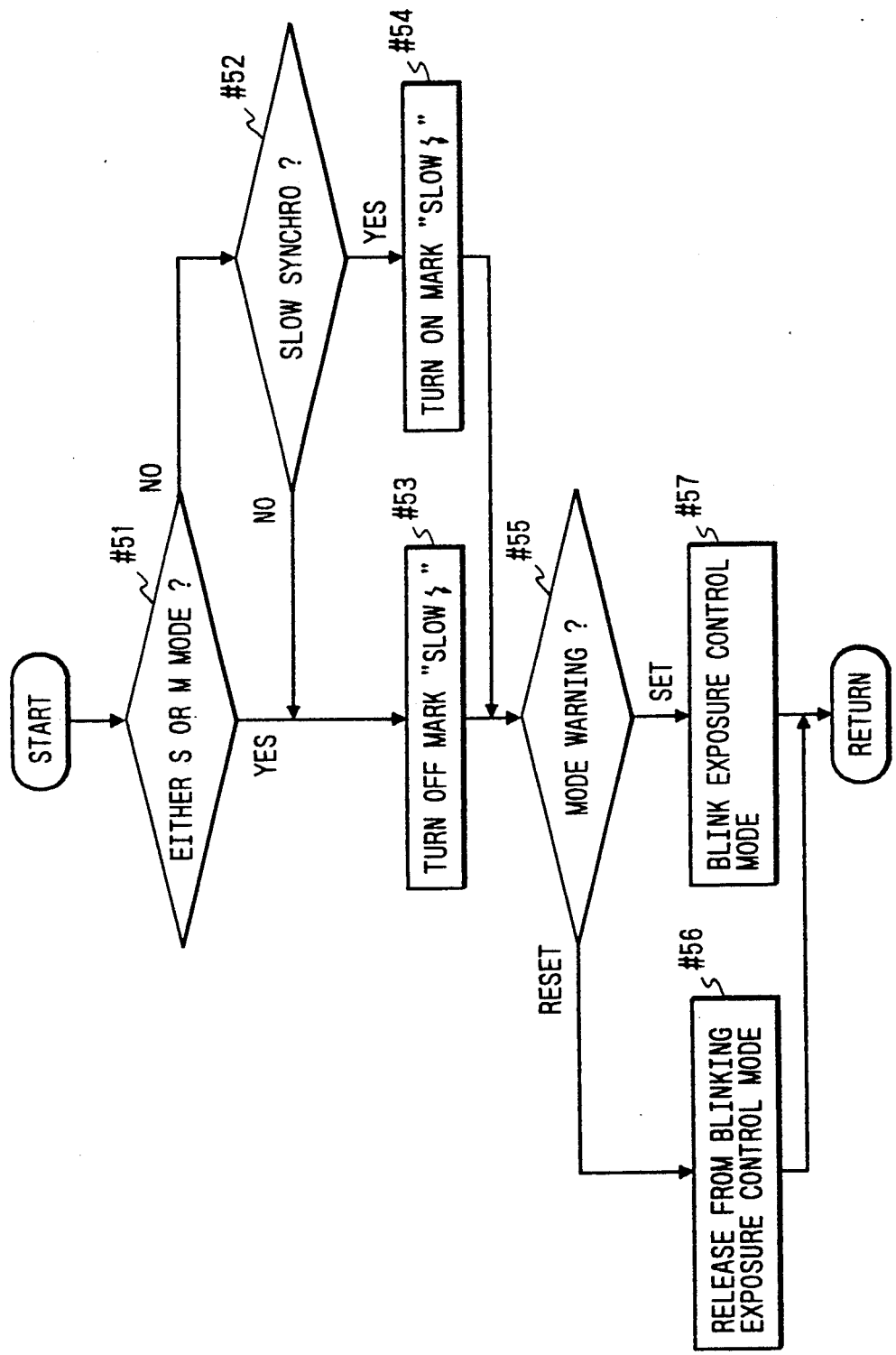

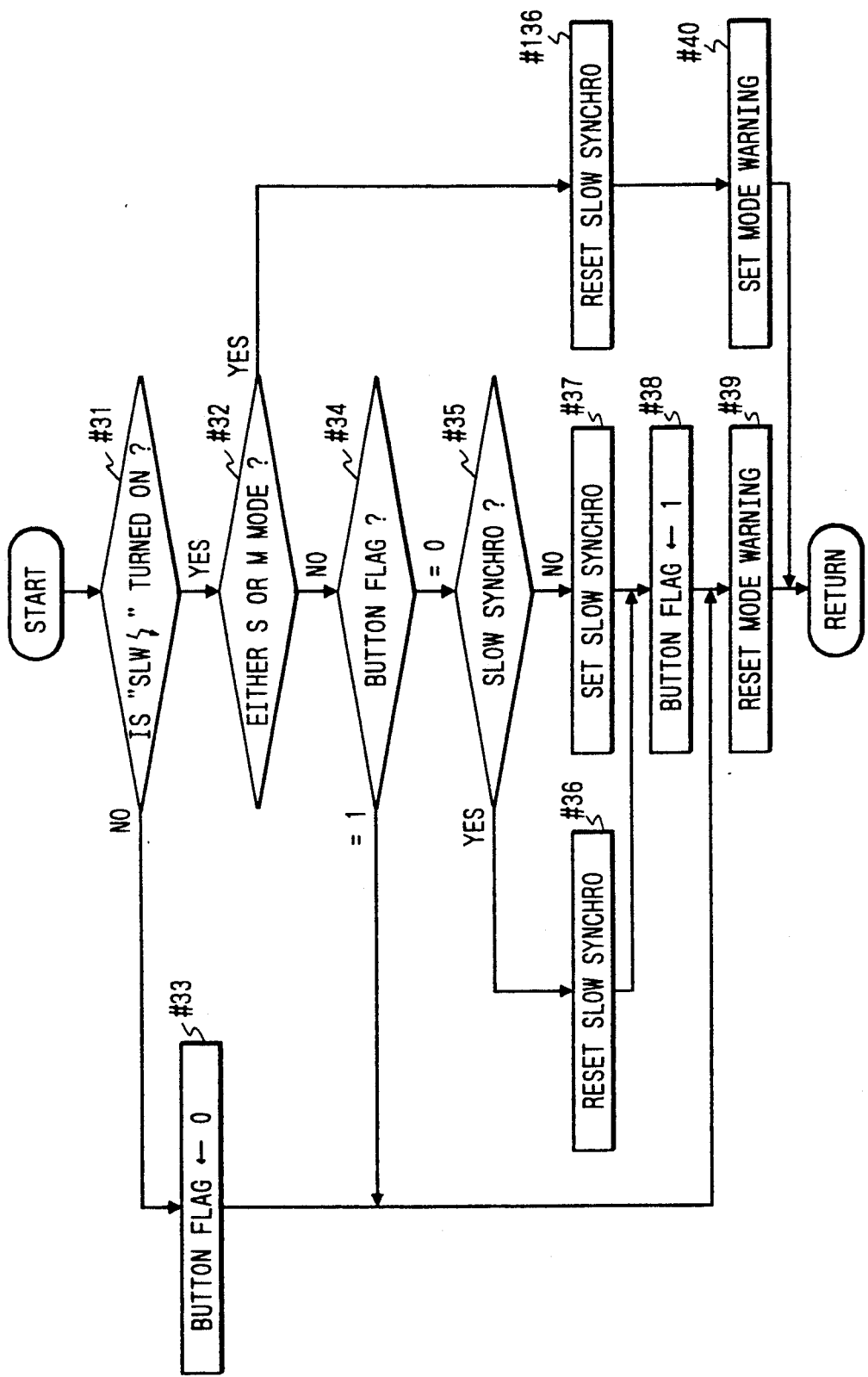

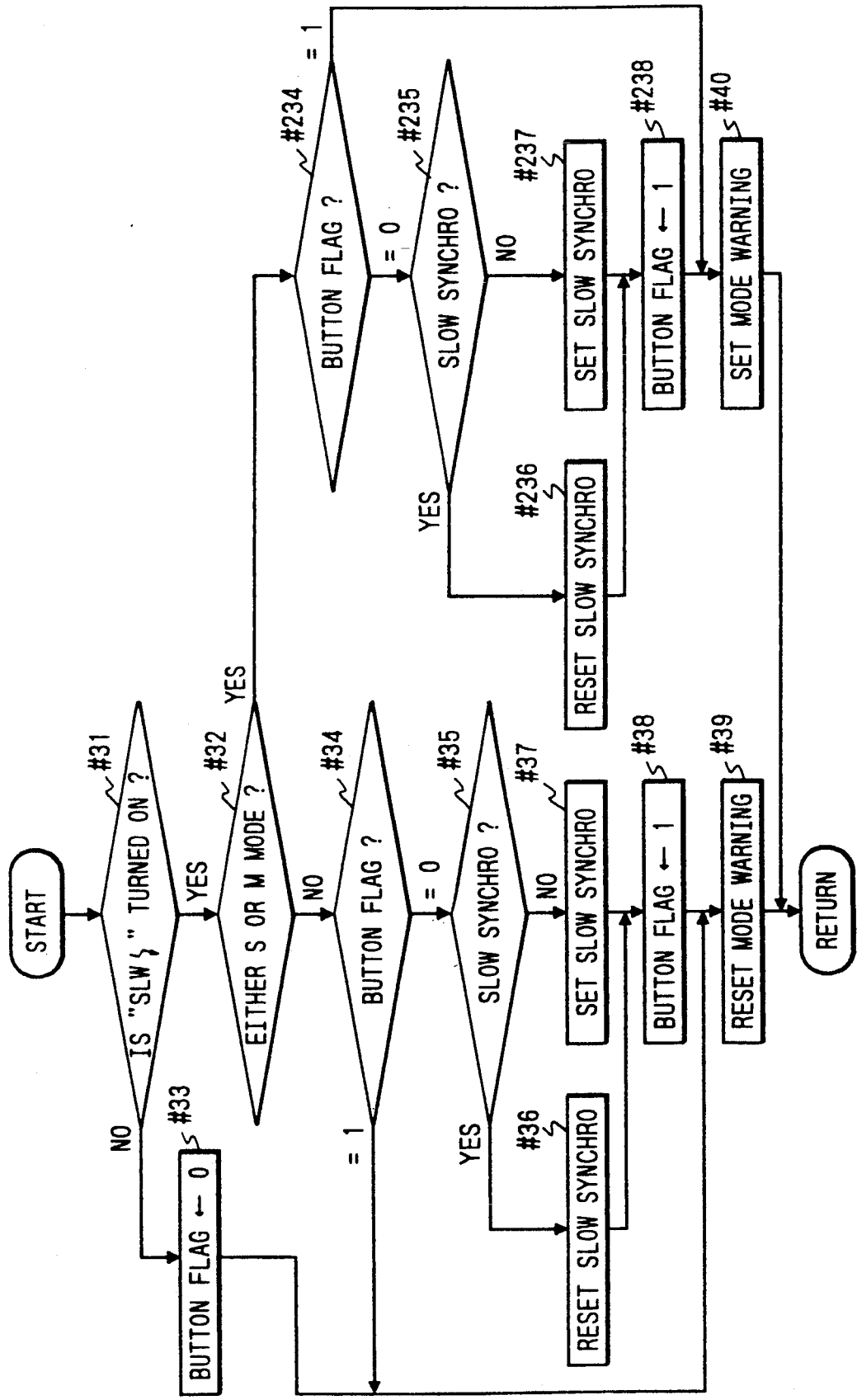

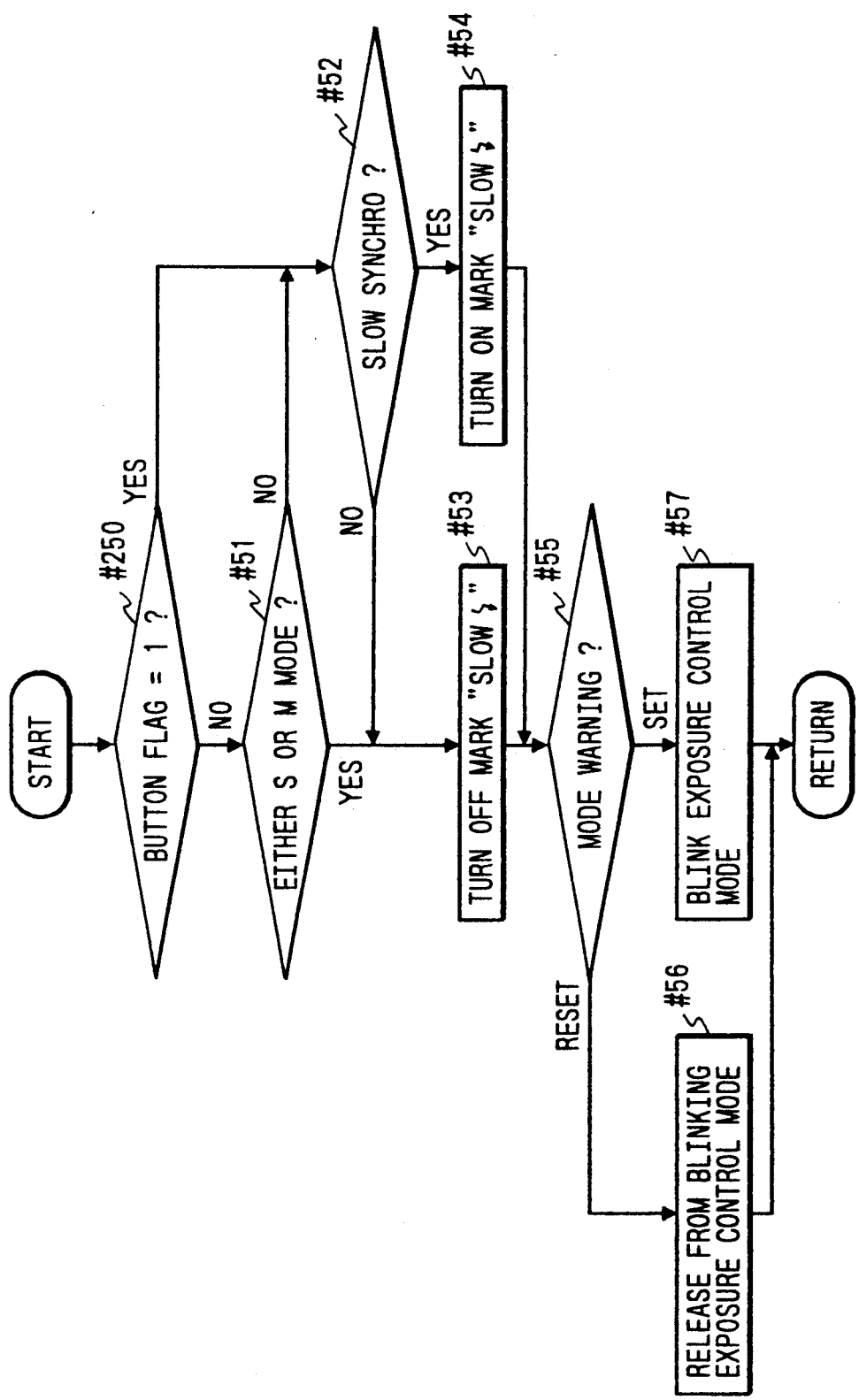

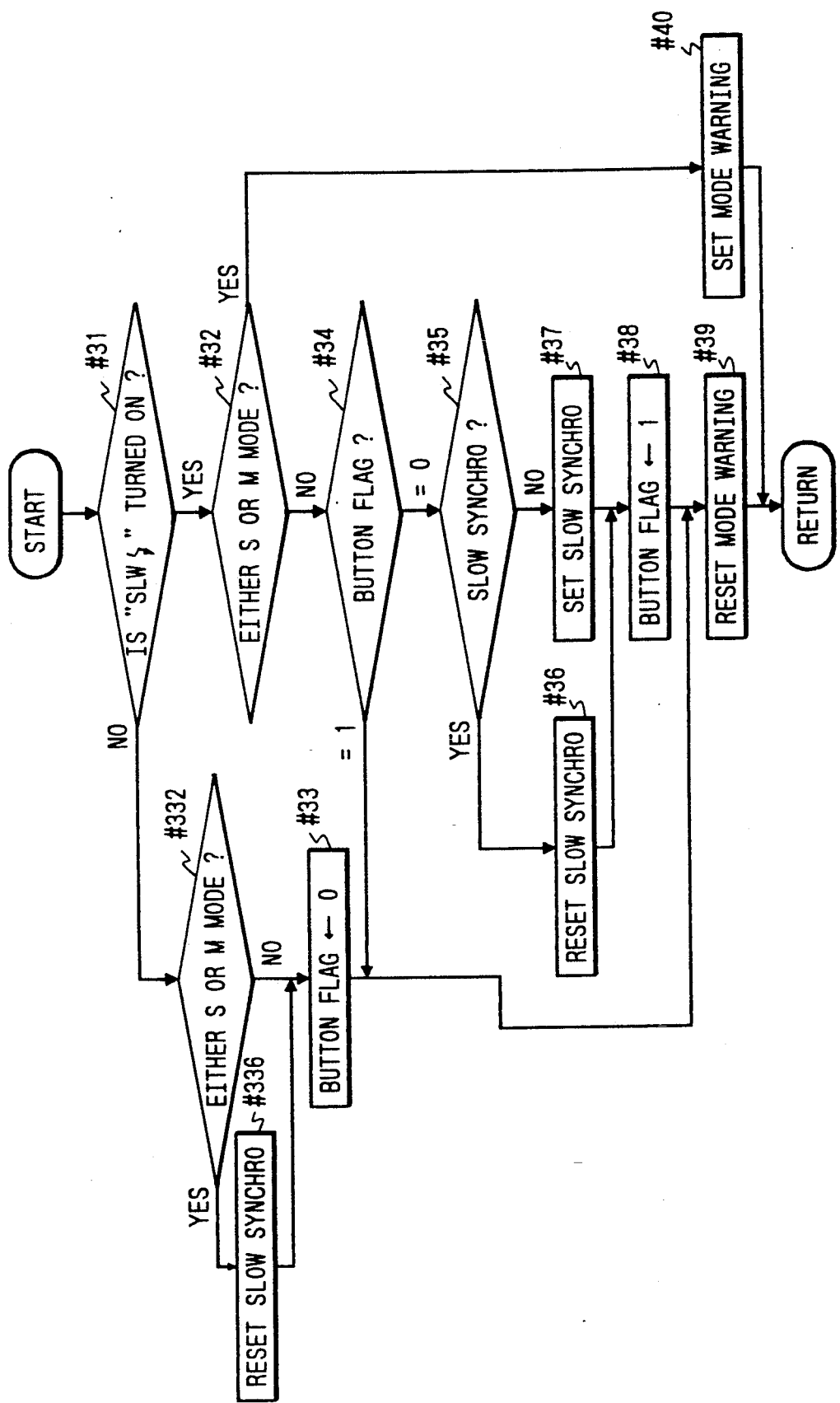

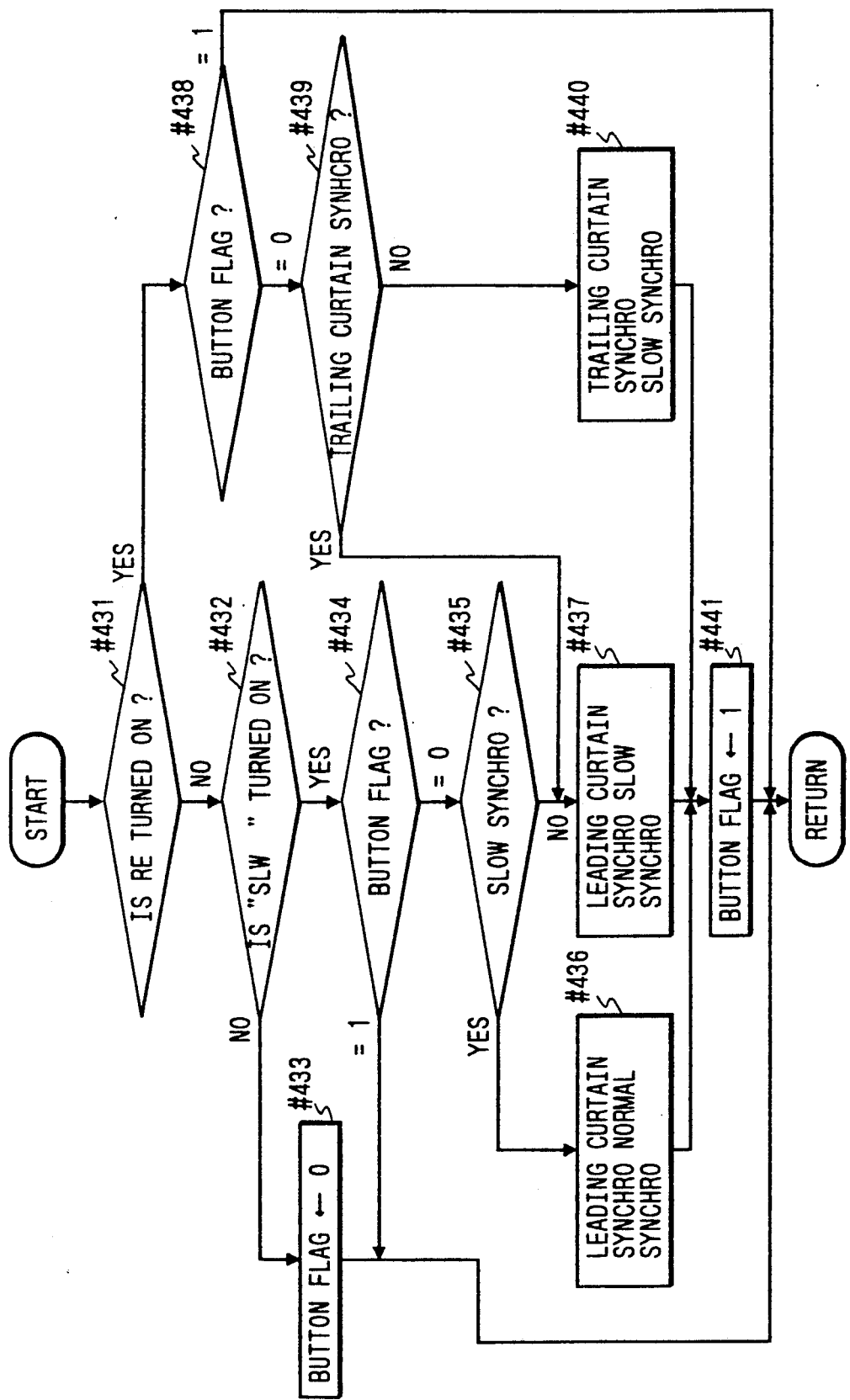

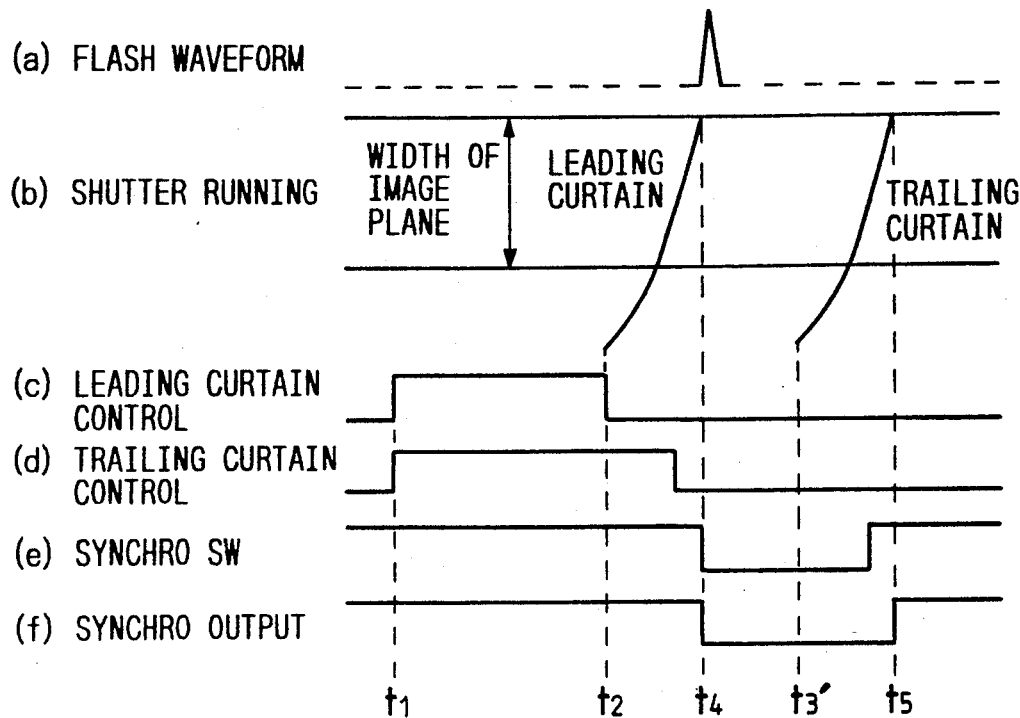
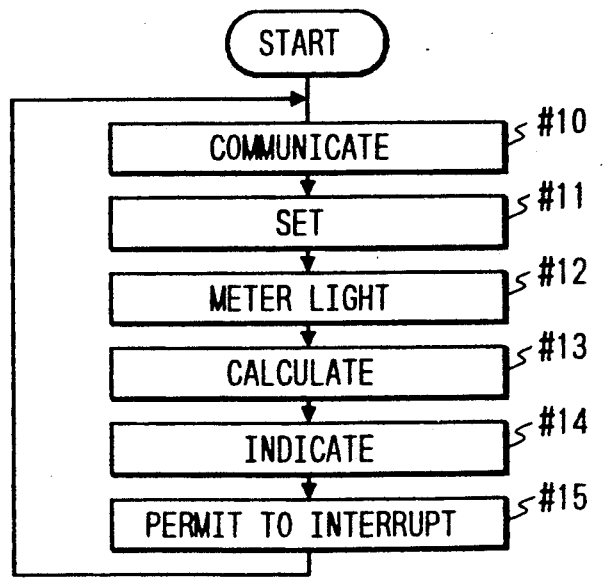

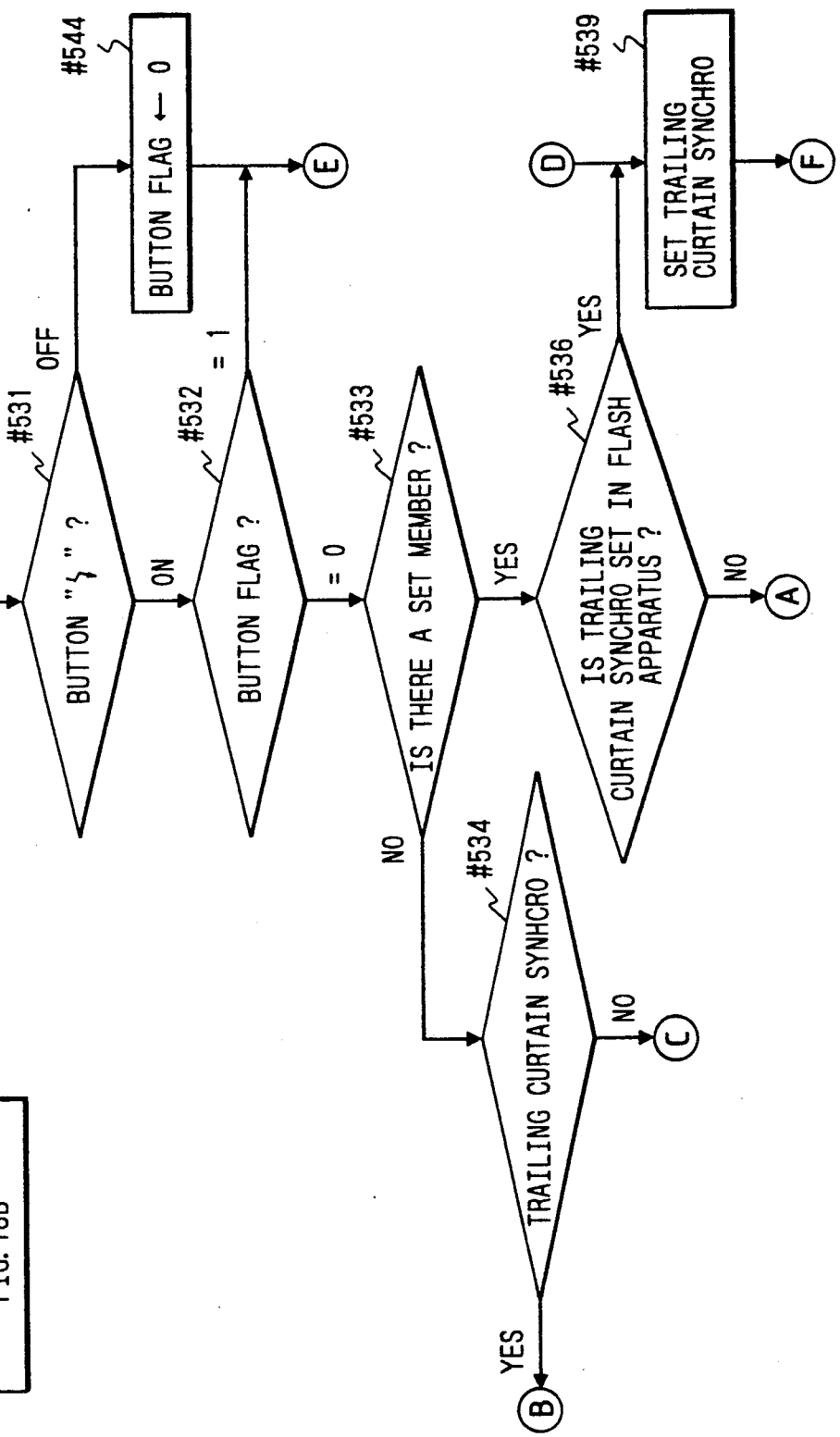

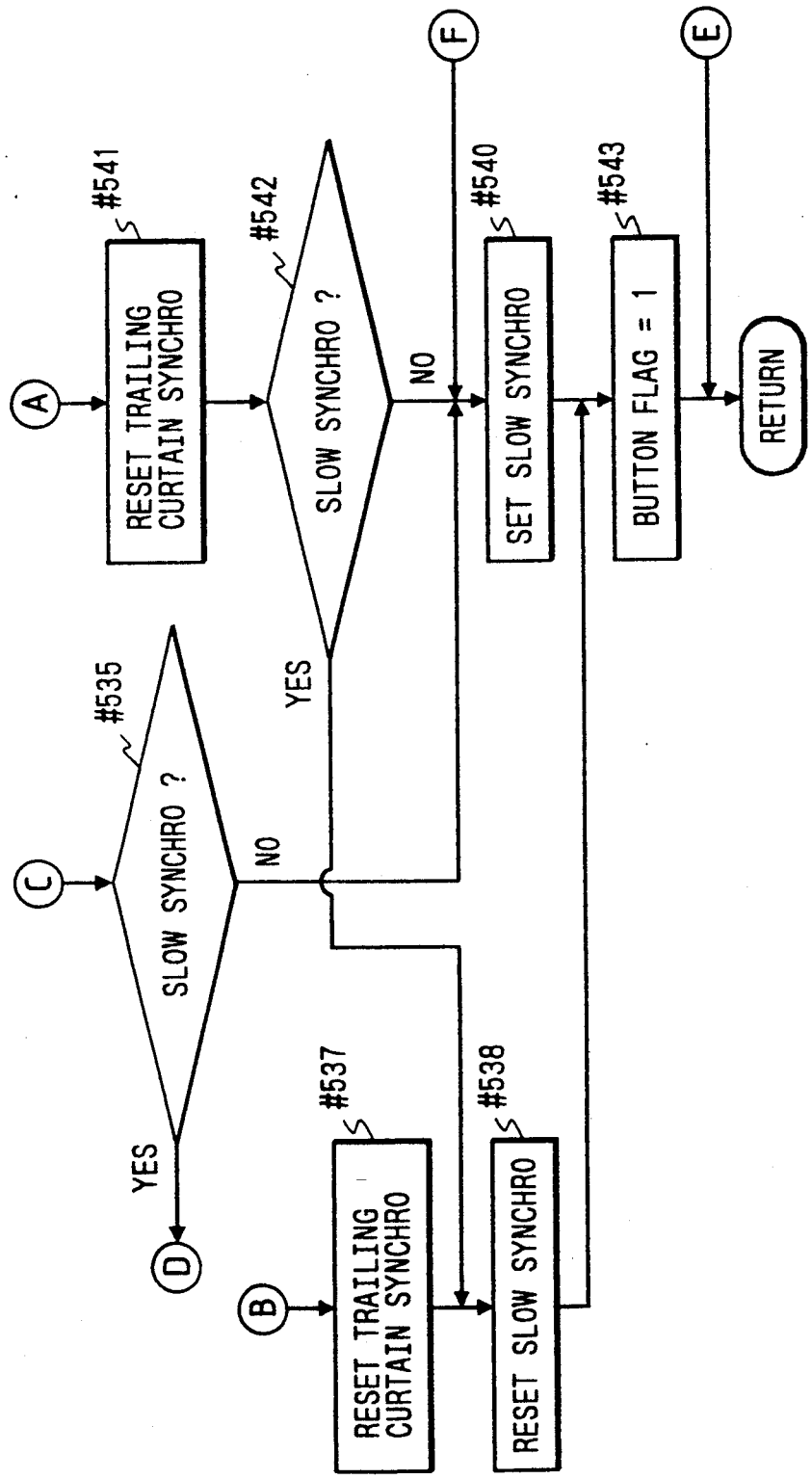

CAMERA CAPABLE OF SLOW SYNCHRO PHOTOGRAPHING

BACKGROUND OF THE INVENTION

1. Field of the Invention

The present invention relates to a camera capable of slow synchro photographing in a camera usable together with a flash apparatus. The slow synchro herein implies a photographing method possible of finely photographing not only a principal subject but also a background night scene by expanding a control range of a shutter speed up to a slow speed time of second.

The present invention is directed, more particularly, to a camera capable of slow synchro in which a flash timing of a built-in or mounted flash apparatus and a shutter speed are controlled.

The present invention is directed, still more particularly, to a camera mountable with a flash apparatus possible of setting a leading curtain synchro mode and a trailing curtain synchro mode.

2. Related Background Art

NIKON F-801 is known as a conventional camera capable of photographing in any one of a shutter speed auto setting exposure mode for automatically setting a shutter speed in accordance with a luminance value of a subject and a shutter speed manual setting exposure mode for setting the shutter speed to a manually set value in the case of photographing by use of a flash apparatus.

A specific flash apparatus is mounted in this camera, and the shutter speed auto setting mode is set. In this case, a restriction of a hand deflection camera-shake limit shutter speed works. This hand deflection limit shutter speed restriction is intended to prevent a photographing failure due to a hand deflection by restricting the shutter speed from being set to a value slower than a hand deflection limit shutter speed (which is the lowest shutter speed within a shutter speed range enough not to cause a photographing failure due to the hand deflection, e.g., 1/60 sec in the case of the same camera). This speed restriction is arranged not to function in the shutter speed manual setting mode.

One of the specific flash apparatuses mounted in F-801 is NIKON speed light SB-24. This flash apparatus has a synchro mode changeover member for determining whether the slow synchro is set or not. This synchro mode changeover member is movable between a synchro mode setting position and a normal synchro mode setting position. A position of the synchro mode changeover member makes it possible to know which synchro mode to set.

Where this slow synchro mode is set in the shutter speed auto setting exposure mode, F-801 photographs finely not only the principal subject but also the background night scene thereof. It is therefore feasible to control the shutter at a speed slower than the hand deflection limit shutter speed in accordance with a subject luminance by releasing the restriction of the hand deflection limit shutter speed.

In a combination of NIKON F-801 with NIKON speed light SB-24, however, the synchro mode changeover member is movable to the normal and slow synchro mode setting positions even in the shutter speed manual setting exposure mode. Hence, there exists a possibility in which the user misunderstands that there are, as in the case of shutter speed auto setting exposure mode, the normal synchro mode to apply the hand deflection restriction when setting the shutter speed and the slow synchro mode to release the restriction even in the shutter speed manual setting exposure mode.

In this type of conventional cameras, some are capable of switchover-setting a so-called trailing curtain synchro mode for permitting the flash apparatus to emit the light just before shutter trailing curtain running and a so-called leading curtain synchro mode for permitting the flash apparatus to emit the light immediately after shutter leading curtain running.

In the conventional cameras, however, the normal synchro mode is automatically selected during a leading curtain synchro mode selection. The slow synchro mode is automatically selected during a trailing curtain synchro mode selection.

The normal synchro mode is herein defined as a synchro mode in which a shutter speed is set within a range from a synchronizing shutter speed of the flash apparatus to a hand deflection limit shutter speed. The slow synchro mode is defined as a synchro mode in which the shutter speed is set within a range from the synchronizing shutter speed of the flash apparatus to a speed slower than the hand deflection limit shutter speed. It is impossible to select a combination of the leading curtain synchro mode with the slow synchro mode.

If the leading curtain synchro mode is set in the slow synchro mode, a shutter opening time is controlled within a normal shutter control range lower limit. The principal subject is grasped by a flash immediately after a completion of leading curtain running by a release. An expression of the principal subject can be grasped well. If the principal subject is dark, the opening time is controlled under a time of second enough not to cause the hand defection. Where the camera is fixed by a tripod or the like so as not to produce the hand deflection, it is possible to take a photo which sufficiently takes in a flash light source of the flash apparatus 20 and the background light as well. Under such circumstances, there is increasingly a demand for making selectable the combination of the leading curtain synchro mode with the slow synchro mode.

On the other hand, however, if the leading curtain synchro mode/trailing curtain synchro mode and the normal synchro mode/slow synchro mode are independently selectable, a combination of the trailing curtain synchro mode with the normal synchro mode is produced.

Namely, the following is the reason why the trailing curtain synchro mode is effective. Attained is photographing with a natural atmosphere where the light appears to flow behind the principal subject by photographing the principal subject with a flash of the flash apparatus at a proper exposure when closing the trailing curtain while catching a light trace of the moving subject at a slow speed time of second.

Hence, the trailing curtain synchro mode becomes effective in the case of the slow synchro mode in which photographing is performed at the slow speed time of second. If restricted in terms of the hand deflection time of second when the normal synchro mode is set, the effect of the trailing curtain synchro mode can not be obtained.

During the slow synchro mode, however, if the trailing curtain synchro mode always comes, this may be inconvenient in some cases. For instance, when taking a photo of a person with a background of night scene, an expression of the person is captured more easily in the leading curtain synchro mode.

Furthermore, in some of the conventional flash apparatuses, the flash apparatus itself has a changeover member capable of changing over the trailing curtain synchro mode and the leading curtain synchro mode.

In the conventional devices, however, the trailing curtain synchro mode is settable only when a special flash apparatus is mounted therein. Considering a large-sized special flash apparatus or contrastingly a small-sized flash apparatus, it is better to provide a set device in the camera body.

Where the synchro mode set member is provided in the camera body, it follows that the synchro mode set members are provided in both of the flash apparatus and the camera body. A confusion may be induced when setting the synchro mode.

SUMMARY OF THE INVENTION

It is a primary object of the present invention to provide a camera capable of preventing the user from misunderstanding that there are a normal synchro mode where a hand deflection restriction is applied to setting of a shutter speed even in a shutter speed manual setting exposure mode and a slow synchro mode where the restriction is released during slow synchro photographing.

A construction of the present invention to accomplish the above-mentioned object will be explained as follows, with the components marked with symbols used in the embodiments which will be discussed later.

Provided according to an embodiment is an indication controller (SW1, SW2, SW3, 10) for controlling an indicator for effecting a slow synchro indication for showing that a slow synchro mode is set. During a shutter speed auto setting mode, when applying a changeover operation to a synchro mode changeover device for changing over a normal synchro mode and a slow synchro mode, the indication controller permits the indicator to give the slow synchro indication. During a shutter speed manual setting mode, no slow synchro indication is given even when the changeover operation to the slow synchro mode is applied to the synchro mode changeover device.

According to this embodiment, if an exposure control mode is the shutter speed auto setting mode, the indication controller acts to give the slow synchro indication when moving the synchro mode set member to a slow synchro mode setting position. If the exposure control mode is the shutter speed manual setting mode, the indication controller acts to give no slow synchro indication even when moving the synchro mode set member to the slow synchro setting position. If the user tries to set the slow synchro mode during the shutter speed manual setting mode in which there is not originally any restriction in shutter speed, the user does not misunderstand because of no slow synchro indication being given.

Provided according to another embodiment is a synchro mode controller (SW1, SW2, 10) for controlling an operation of a synchro mode changeover device. The synchro mode controller permits a changeover to the slow synchro mode in accordance with a manipulation to the synchro mode changeover device during the shutter speed auto setting mode. The synchro mode controller inhibits the changeover to the slow synchro mode in accordance with the manipulation to the synchro mode changeover device.

According to this embodiment, the synchro mode controller permits the changeover to the slow synchro mode in accordance with the manipulation to the synchro mode changeover device during the shutter speed auto setting mode. During the shutter speed manual setting mode, the synchro mode controller inhibits the changeover to the slow synchro mode in accordance with the manipulation to the synchro mode changeover device. A meaningless changeover to the synchro mode is also thereby inhibited. It is therefore possible to make invalid the manipulation to the synchro mode changeover device more surely.

According to still another embodiment, a synchro mode controller (10, SW1, SW2) is provided. When the shutter speed setting mode changeover device performs a changeover from the shutter speed auto setting mode to the shutter speed manual setting mode during a slow synchro mode setting operation, a changeover from the slow synchro mode to the normal synchro mode is automatically effected interlocking therewith.

According to this embodiment, the synchro mode controller causes the shutter speed setting mode changeover device to perform the changeover from the shutter speed auto setting mode to the shutter speed manual setting mode during the slow synchro mode setting operation. The changeover from the slow synchro mode to the normal synchro mode is then carried out interlocking therewith. The normal synchro mode invariably comes when performing the changeover from the shutter speed auto setting mode to the shutter speed manual setting mode. This improves the operability.

According to a further embodiment, a warning indicator (SW1, SW3, 14, 10) is provided. If the exposure control mode is the shutter speed manual setting mode, and when the synchro mode changeover device is operated, a warning indication is given.

According to this embodiment, if the exposure control mode is the shutter speed manual setting mode, and when the synchro mode changeover device is operated, the warning indication is given. It is therefore possible for the user to recognize that an insignificant operation is being carried out.

It is another object of the present invention to provide a camera capable of slow synchro in which a trailing curtain synchro mode is selected only during a synchro mode (slow synchro mode) with no restriction of a slow speed time of second to make photographing effective.

To accomplish the foregoing object, in a camera incorporating or mountable with a flash apparatus 20, a camera possible of slow synchro according to the present invention comprises: a first set device for setting any one of a first synchro mode for setting a shutter speed in a range from a synchronizing time of second of the flash apparatus 20 to a hand deflection limit time of second, i.e., the synchro mode (normal synchro mode) with a restriction of the slow speed time of second and a second synchro mode for setting the shutter speed in a range from the synchronizing time of second to a time of second slower than the hand deflection limit time of second, viz., the synchro mode (slow synchro mode) with no restriction of the slow speed time of second; a second set device for setting any one of a leading curtain synchro mode for emitting the light of the flash apparatus immediately after a completion of shutter leading curtain running and a trailing curtain synchro mode for emitting the light of the flash apparatus just before shutter trailing curtain running; and an inhibition device for inhibiting simultaneous setting of the synchro mode (normal synchro mode) with the restriction of the slow speed time of second and the trailing curtain synchro mode.

Constructed also is the camera capable of slow synchro, wherein when the trailing curtain synchro mode is set, the synchro mode with no restriction of the slow speed time of second is automatically set.

Based on the above-described construction, the synchro mode (slow synchro mode) with no restriction of the slow speed time of second can be combined with the leading curtain synchro mode.

Inhibited is a combination of the (normal) synchro mode with the restriction of the slow speed time of second with the trailing curtain synchro mode.

When the trailing curtain synchro mode is set, the synchro mode (slow synchro mode) with no restriction of the slow speed time of second is automatically set.

It is still another object of the present invention to provide a camera capable of preventing a confusion caused in setting of the synchro mode by giving a priority to the synchro mode set by the flash apparatus in such a case that each of the camera and the flash apparatus has a set device for setting any one of the leading curtain synchro mode and the trailing curtain synchro mode.

To accomplish the above-mentioned object, in a camera mountable with a flash apparatus including a set device for setting any one of a leading curtain synchro mode for emitting the light immediately after a completion of shutter leading curtain running and a trailing curtain synchro mode for emitting the light just after a start of shutter trailing curtain running, a camera capable of setting the synchro mode according to this invention comprises: a set device for setting any one of the leading curtain synchro mode and the trailing curtain synchro mode; and a detection device for detecting mounting or non-mounting of the flash apparatus and also detecting which synchro mode to set in the flash apparatus when the flash apparatus is mounted, the camera functioning in accordance with the synchro mode exclusively set in the flash apparatus.

Based on the above-described construction, if the flash apparatus including the set device is not mounted, the set member provided on the side of the camera sets any one of the leading curtain synchro mode and the trailing curtain synchro mode.

If the flash apparatus including the set device for the synchro mode is mounted, the priority is given to the synchro mode set on the side of the flash apparatus in advance of the synchro mode set on the side of the camera.

BRIEF DESCRIPTION OF THE DRAWINGS

Other objects and advantages of the invention will become apparent during the following discussion taken in conjunction with the accompanying drawings, in which:

FIG. 2 is a flowchart of a main routine of a MCU 10;

FIG. 3 is a flowchart of a timer interrupt processing routine;

FIG. 4 is a flowchart of a subroutine associated with setting of a synchro mode in one embodiment;

FIG. 5 is a flowchart of an indication routine which is a part of the indication routine and associated with the slow synchro;

FIG. 8 is a flowchart of a subroutine associated with setting of the synchro mode in a first variant embodiment;

FIG. 9 is a flowchart of a subroutine associated with setting of the synchro mode in a second variant embodiment;

FIG. 10 is a flowchart of a variant indication routine which is a part of the indication routine and associated with the slow synchro;

FIG. 11 is a flowchart of a subroutine associated with setting of the synchro mode in a third variant embodiment;

FIG. 12 is a flowchart of a subroutine associated with setting of the synchro mode in another embodiment;

FIGS. 14(a) to (f) through 16(a) to (f) are timing charts showing timings during shutter control;

FIG. 17 is a flowchart of a main routine of the MCU 10;

FIG. 18 is a flowchart of a subroutine associated with setting of the synchro mode;

DETAILED DESCRIPTION OF THE PREFERRED EMBODIMENTS

Figure 1:
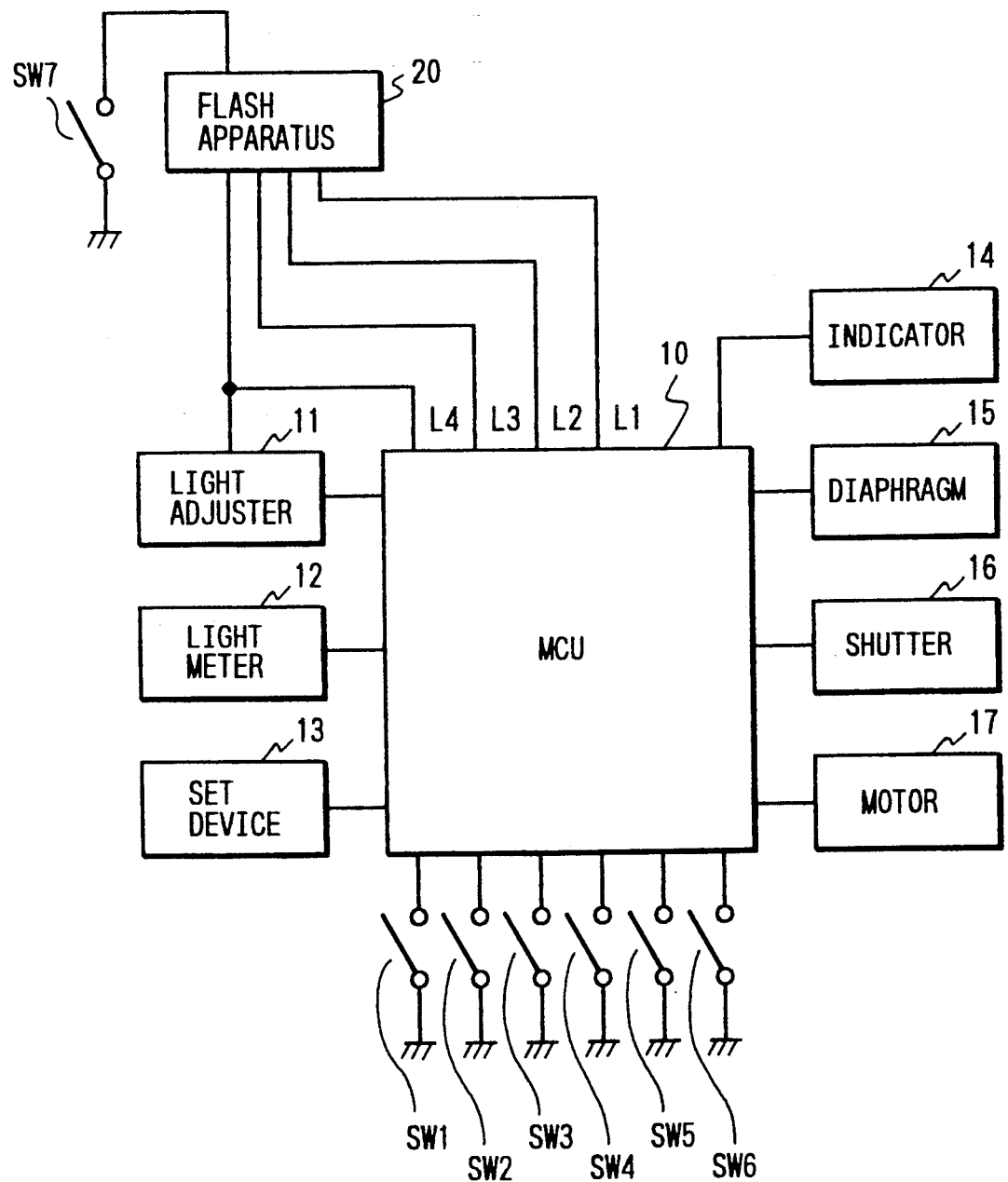
FIG. 1 is a block diagram showing one embodiment of the present invention.

FIG. 1 is a block diagram showing one embodiment of the present invention.

An EEPROM built-in microcomputer 10 is capable of holding the data stored therein even when applying no power supply. This is hereinafter referred to as an MCU (microcomputer unit). A light adjuster 11 connected to the MCU 10 controls the light emitted from a flash apparatus 20. A light meter 12 connected to the MCU 10 measures a brightness of a subject through a lens and outputs a subject luminance value. A set device 13 connected to the MCU 10 sets a variety of parameters such as a film sensitivity and others within the MCU 10. An indicator 14 connected to the MCU 10 indicate-outputs respective set values and control values. A diaphragm controller 15 connected to the MCU 10 controls a diaphragm according to a diaphragm value obtained in the MCU 10. A shutter controller 16 connected to the MCU 10 controls a shutter at a shutter speed obtained in the MCU 10. A motor controller 17 connected to the MCU 10 performs sequence control and feeds a film.

Based on the luminance value obtained by the light meter 12, the MCU 10 seeks a control value. The shutter controller 16 effects its operation in accordance with this value.

Designated at SW1 is a first exposure control mode setting switch for setting an exposure mode. The symbol SW2 represents a second exposure mode setting switch for setting an exposure mode. The setting switches SW1, SW2 are prescribed as shown in Table 1 in accordance with the exposure control mode. If the exposure mode is like this: a shutter speed auto setting mode—an A mode (diaphragm preference exposure control mode) or a P mode (program exposure control mode)—, the first exposure setting switch SW1 is turned off. At that moment, if the second exposure mode setting switch SW" is turned on, the exposure control mode becomes the A mode. Whereas turned off, it becomes the P mode. If the exposure control mode is like this: a shutter speed manual setting mode—an S mode (shutter speed preference exposure control mode) or an M mode (manual exposure control mode)—, the first exposure mode setting switch SW1 is turned on. At that time, if the second exposure mode setting switch SW2 is turned on, the exposure control mode becomes the M mode. Whereas if turned off, it becomes the S mode.

TABLE 1

|   | SW1 | SW2 |
|---|-----|-----|
| P | OFF | OFF |
| A | OFF | ON  |
| S | ON  | OFF |
| M | ON  | ON  |

The switch SW3 is a synchro mode changeover switch, interlocking with an unillustrated [SLW ʖ] button, for changing over setting/releasing of slow synchro. When depressing the unillustrated [SLW ʖ] button, the synchro mode changeover switch SW3 is turned on. Upon a release of the depression, the synchro mode changeover switch SW3 is turned off. Every time the synchro mode changeover switch SW3 is turned on by pushing this [SLW ʖ] button, setting/releasing of slow synchro are alternately changed over, and setting remains invariable even by continuous pushing. Upon a release of the slow synchro mode, a normal synchro mode is set.

During the shutter speed auto setting mode, the slow synchro mode is not set, and the flash apparatus 20 is made to function. In this case, the MCU 10 calculates a shutter speed on the basis of subject luminance information given from the light meter 12. A failure of photographing due to a hand deflection is prevented by restricting the arithmetic result from being lower than a hand deflection limit shutter speed (e.g., 1/60 sec). This speed restriction is released by changing the slow synchro mode from the non-setting state to the setting state. The speed restriction does not function during the shutter speed manual setting mode. The MCU 10 changes over a permission and inhibition of the function of the above-mentioned speed restriction, depending on the states of the first exposure mode setting switch SW1 and the synchro mode changeover switch SW3 (the details will be given latter).

Designated at SW4 is a release switch interlocking with an unillustrated release button. The switch SW4 is turned on when pushing the unillustrated release button, and a release sequence is thereby started.

A switch or synchro switch SW5 is turned on when shutter leading curtain running is completed and turned off interlocking with trailing curtain running.

The flash apparatus 20 built in or mountable in a camera transmits its power-on as a ready signal to the MCU 10 and starts flashing by a synchro output from the MCU 10. The flash apparatus 20 stops flashing on receiving a stop signal from the light adjuster 11.

FIG. 2 is a flowchart of a main routine within the MCU 10.

In step #11, a subroutine call is effected with respect to a set routine. Set are a variety of parameters within the MCU 10 in accordance with the states of the set device 13, the first exposure mode setting switch SW1, the second exposure mode setting switch SW2 and the synchro mode changeover switch SW3.

In next step #12, a photometric routine undergoes a subroutine call. A photometric output from the light meter 12 undergoes an A/D conversion into luminance information. The action moves to next step #13.

In step #13, an arithmetic routine is subjected to the subroutine call. An APEX arithmetic operation is performed in accordance with the luminance information obtained in step #12 and the set value information obtained in step #11. A control value is thus obtained.

In next step #14, a delay routine undergoes the subroutine call. Obtained are indication data corresponding to the control value acquired in step #13 and the set value determined in step #11. The indication data are sent to the indicator 14 where indications required are given. Next, the action moves to step #15.

In step #15, an interrupt is permitted. The action returns to step #11, wherein the processes described above are repeated.

FIG. 3 is a flowchart of a timer interrupt processing routine which will be executed after permitting the interrupt in step #15 of FIG. 2. When the timer interrupt is permitted, there is effected a change to a process of main routine in the course of executing the main routine of FIG. 2 by the timer interrupt per 1[ms]. In step #21, on/off states of the release switch SW4 are checked. If in the off-state, the action returns directly to the process of main routine. Whereas in the on-state, the action moves to step #22 where the release sequence is started.

In step #22, an electromagnet Mg for holding the leading and trailing curtains of the shutter is energized, thus holding the shutter by an electric system.

In step #23, a motor is reversely rotated by driving the motor controller 17 to initiate a mirror-up.

Set in step #24 is a light adjustment sensitivity of the light adjuster 11 in accordance with a film sensitivity set in step #11 of FIG. 2.

Controlled in step #25 is a diaphragm according to the diaphragm value obtained in step #13 of FIG. 2 by driving the diaphragm controller 15.

In step #26, with a detection of completion of the mirror-up by use of an unillustrated mirror switch, the motor is stopped by driving the motor controller 17.

In step #27, the shutter is controlled according to the shutter speed obtained in step #13 of FIG. 2 by driving the shutter controller 16. In the meantime, the synchro switch SW5 continues to be monitored. A synchro output is given forth by turning on the synchro switch with completion of shutter trailing curtain running, thereby controlling the flash apparatus 20.

In step #28, the motor is rotated forwards by driving the motor controller 17, thus performing a step of mirror-down. A shutter charge and a film take-up are then effected. Finally, the motor is stopped with a variation in an unillustrated take-up completion switch. A series of release sequences come to an end in the manner discussed above.

FIG. 4 is a flowchart of a subroutine which is a part of the set routine where the subroutine call is performed in step #11 of FIG. 2 and is also associated with the synchro mode.

Checked in step #31 are on/off states of the synchro mode changeover switch SW3 interlocking with an unillustrated [SLW ♩] button. If turned on by depressing the button, the action moves to step #32. Whereas if kept off without pushing the button, the action moves to step #33.

Examined in step #32 is whether the exposure control mode is the S or M mode. If it comes under the S or M mode, the action moves to step #40. If it comes under the A or P mode, the action moves to step #34.

In step #33, a button flag is set to 0. In step #34, whether the button flag is 0 or 1 is checked. If the flag is 1, the action skips over to step #39. If the flag is 0, the action moves to next step #35.

When the unillustrated [SLW ♩] button is not depressed, setting of the button flag can be changed over with the flag being 0 while the synchro mode changeover switch SW3 is kept off. When the unillustrated [SLW ♩] button is continuously depressed, however, the flag remains to be 1, while a change in setting is made invalid.

In step #35, whether or not the slow synchro mode is set is checked depending on setting or non-setting of a slow synchro flag. If the slow synchro flag is set, and when being set to the slow synchro mode, the action moves to step #36. If the slow synchro flag is reset, and when slow synchro setting is not done, the action moves to step #37.

If this slow synchro flag is set, and when slow synchro setting is done, there is released the restriction of the above-mentioned hand deflection limit shutter speed which works during the shutter speed control in the shutter speed auto setting mode. If the slow synchro flag is reset, and when slow synchro setting is not effected, the restriction thereof is not released. During the shutter speed manual setting mode, the restriction of the hand deflection shutter speed is always released irrespective of the state of this slow synchro flag.

In step #36, the slow synchro setting flag is reset, and the action moves to step #38.

In step #37, the slow synchro setting flag is set.

In next step #38, the button flag is set, and the action moves to step #39.

In step #39, a warning flag of the exposure control mode is reset, and the action is returned.

In step #40, the warning flag of the exposure control mode is set, and the action is returned.

FIG. 5 is a flowchart of an indication routine which is a part of the indication routine where the subroutine call is performed in step #14 of FIG. 2 and is associated with the slow synchro.

In step #51, whether the exposure control mode is the S or M mode is checked. If it comes under the S or M mode, the action moves to step #53. If it comes under the A or P mode, the action moves to step #52.

Examined in step #52 is whether the slow synchro setting flag is set or not. If set, the action moves to step #54. If reset, the action moves to step #53.

In step #53, a mark [SLOW ♩] is turned off, and the action moves to step #55.

In step #54, the mark [SLOW ♩] is turned on, and the action moves to step #55.

In step #55, whether or not the warning flag of the exposure control mode is set is checked. If set, the action moves to step #57. If reset, the action moves to step #56.

In step #56, blinking of the exposure control mode is released, and the action is returned.

In step #57, the exposure control mode is brought into the blinking state, and the action is returned.

Where the unillustrated [SLW ♩] button is not pushed, in the routine of FIG. 4, the action modes from step #31 to step #33, and the button flag is reset. The action moves to step #39, and the mode warning flag is reset. Then returns the action. On this occasion, in a flow of action in FIG. 5, if the exposure mode is the S or M mode, the action moves from step #51 to step #53. Regardless of the slow synchro flag, the mark [SLOW ♩] is invariably turned off. On the other hand, if the exposure control mode is A or P mode, in the flow of action in FIG. 5, the action moves from step #51 to #52. The on/off states of the mark [SLW] are switched over corresponding to the slow synchro flag. If the slow synchro flag is set, the action moves to step #54, and the mark [SLOW ♩] is turned on. If the slow synchro flag is reset, the action moves to step #53, and the mark [SLOW ♩] is turned off. The warning flag is reset, and hence the action moves from step #55 to step #56. A blinking warning state of the exposure control mode is not developed.

If the exposure control mode is the A or P mode, the synchro mode changeover switch SW3 is turned on by depressing the unillustrated [SLW ♩] button. On this occasion, in a flow of action in FIG. 4, the action moves from step #31 to step #32 and further to step #34. Besides, the button flag is 0 at the starting time before depressing the [SLW ♩] button. Therefore, the action moves to step #35. If the slow synchro is set before pushing the [SLW ♩] button, the action moves to step #36 to release slow synchro setting. If the slow synchro mode is not set before pushing the unillustrated [SLW ♩] button, the action moves to step #37 where the slow synchro mode is set. In either case, it follows that the synchro mode is inverted by manipulating the [SLW ♩] button. When the action moves to step #38, the button flag becomes 1. The action moves to step #39 where the mode warning flag is reset. Even when continuously pushing the unillustrated [SLW ♩] button, since the flag is 1, the action next jumps from step #34 to step #39. For this reason, setting remains invariable. A change of setting involves the steps of temporarily releasing the depression of the unillustrated [SLW ♩] button and turning off the synchro mode changeover switch SW3. In the flow of action in FIG. 5, the action moves from step #51 to step #52. The on/off states of the mark [SLOW ♩] are switched over in accordance with the slow synchro flag. The warning flag is reset, and hence the action moves from step #55 to step #56, resulting in no blinking warning state of an exposure control mode mark.

When exposure control mode is the S or M mode, the synchro mode changeover switch SW3 is turned on by depressing the unillustrated [SLW ♩] button. In FIG. 4, the action moves from step #31 to step #32 and further to step #40 where the mode warning flag is set. In the flow of action in FIG. 5, the action moves from step #51 to step #53 where the mark [SLOW ♩] is always turned off irrespective of the slow synchro flag. Since the warning flag is set, the action moves from step #55 to step #57, resulting in the blinking warning state of the exposure control mode mark. Hence, the mode is, it can be comprehended, such an exposure control mode as to make the slow synchro mode impossible of setting. On separating the hand from the unillustrated [SLW ♩] button, in the flow of action of FIG. 4, the action moves like this: step #31—step #33—step #39. Therefore, as discussed above, the warning indication disappears.

As described above, the slow synchro flag is invertible only when the exposure control mode is the A or P mode. When the exposure control mode is the S or M mode, no indication of slow synchro is given. This does not imply that setting is released. In slow synchro set in the A or P mode, the original indication thereof is attainable by setting the mode back to the A or P mode even if the indication disappears when being set to the S or M mode.

The slow synchro mode flag and other setting information are stored in the EEPROM built in the MCU 10. It is therefore possible to resume the manipulation of the camera by setting before turning off the power supply when turning on the power supply once again after a turnoff of the power supply.

The following is an explanation of relations between the respective switches and the indications.

FIGS. 6A through 6C, 7A and 7B show the indications associated with slow synchro of the camera according to the present invention.

Figure 6A:
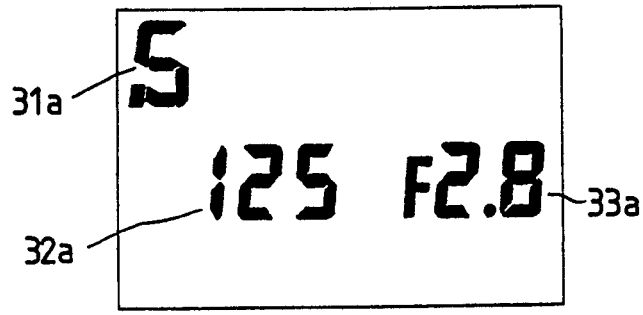
FIGS. 6A-6C, 7A and 7B are diagrams illustrating indications associated with the slow synchro of a camera of this invention.
Figure 6B:
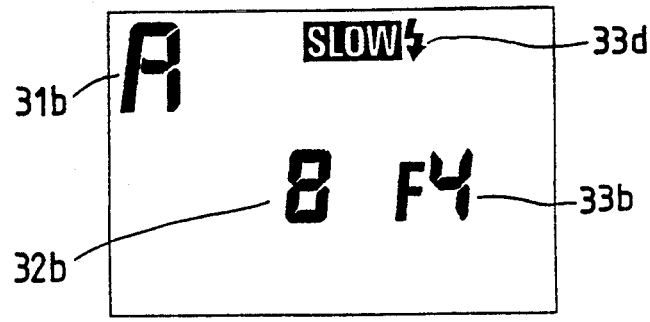
Figure 6C:
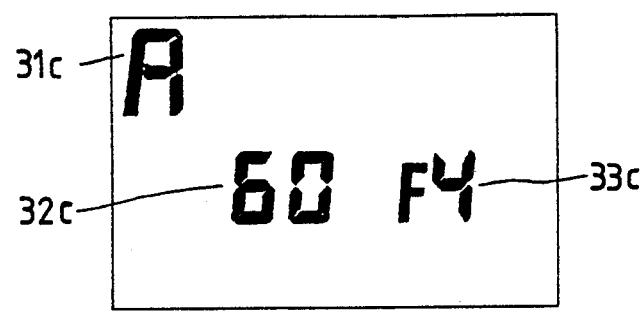

FIGS. 6A–6C show the indications in such a case that the slow synchro mode has already been set in the initial state. Referring to FIG. 6A, the S mode is selected as an exposure control mode (31a in the Figure), so that the mark [SLOW ↱] is turned off. Next, the A mode (31b in the Figure) is selected from the state of FIG. 6A. At this time, if the slow synchro flag is set, as shown in FIG. 6B, a [SLOW ↱] mark 33d is turned on. Further, the synchro mode changeover switch SW3 is turned on by depressing the unillustrated [SLW ↱] button. As illustrated in FIGS. 6B and 6C, the mark [SLOW ↱] is turned off. The synchro mode changeover switch SW3 is turned on by depressing the unillustrated [SLW ↱] button once again. The display reverts to the state of FIG. 6B.

Figure 7A:
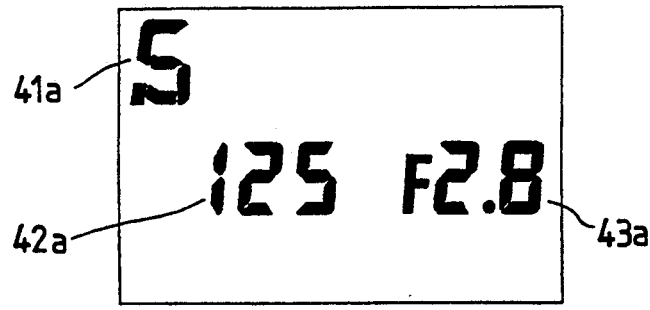
Figure 7B:
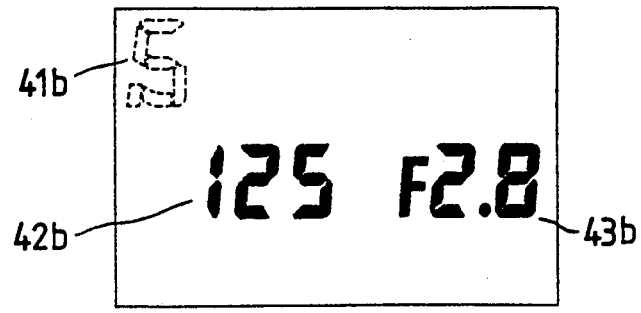

FIGS. 7A and 7B show indications when the slow synchro mode is not set in the initial state. Referring to FIG. 7A, the mark [SLOW ↱] of the slow synchro mode which is not yet set is kept off. Next, when depressing the unillustrated [SLW ↱] button for setting the slow synchro mode, as depicted in FIG. 7B, a blinking state of the exposure control mode mark 41b is developed. The blinking state in the Figure is, as indicated by 41b, expressed by a void character of a broken line. Upon a release of the depression of the unillustrated [SLW ↱] button depicted in FIG. 7B, as illustrated in FIG. 7A, the exposure control mode mark 41a reverts to the turn-on state. Note that in FIGS. 6A–6C, 7A and 7B, there are indicated shutter speed values 32a, 32b, 32c, 42a, 42b and diaphragm values 33a, 33b, 33c, 43a, 43b.

Note that in accordance with this embodiment, the following variant embodiments will be obtained by changing the flow of action in FIG. 4.

FIG. 8 shows a first variant embodiment of the subroutine associated with synchro mode setting of FIG. 4. In this first variant embodiment, the user always, after depressing a synchro mode changeover member during the M mode, resets the slow synchro flag. During the S or M mode, no indication of the mark [SLOW ↱] is given. Hence, an advantage is exhibited, wherein when being changed over to the P or A mode, the arrangement that the slow synchro is reset is more recognizable.

A different point from FIG. 4 is that step #136 is added to the action flow from step #32 to step #40. In step #32, if the exposure control mode is the S or M mode, the action moves to step #136. In step #136, the slow synchro setting flag is reset, and the action moves to step #40. In step #40, the mode warning flag is set, and the action is returned.

FIG. 9 shows a second variant embodiment of the subroutine associated with synchro mode setting of FIG. 4. In accordance with the second variant embodiment, during even the S or M mode, a switchover between the slow synchro mode and the normal synchro mode can be performed by depressing the unillustrated [SLW ↱] button. Therefore, this second variant embodiment presents such an effect that setting and resetting of only the slow synchro mode can be changed over beforehand with taking trouble to make the switchover to the P or A mode.

A different point from FIG. 4 is that steps #234 through #238 having the same functions as those of steps #34 through #38 are added to the action flow from step #32 to step #40. In step #32, if the exposure control mode is the S or M mode, the action moves to step #234. In step #234, when the button flag is 1, the action moves to step #40. When the button flag is 0, the action moves to step #235. In step #235, whether the exposure control mode is set to the slow synchro mode or not is examined. If the slow synchro mode is set, and when slow synchro setting is done, the action moves to step #236. If the slow synchro flag is reset, and when slow synchro setting is not done, the action moves to step #237. In step #236, the slow synchro setting flag is reset, and the action moves to step #238. In step #237, the slow synchro setting flag is set, and the action moves to step #238. In step #238, the button flag is set to 1, and the action moves to step #40. In step #40, the mode warning flag is set, and the action is returned.

FIG. 10 shows a variant indication embodiment of FIG. 5. Every time the [SLW ↱] button is pushed, the turn-on/turn-off of [SLOW ↱] indication are changed over. During the S or M mode, however, [SLOW ↱] is being indicated while pushing the [SLW ↱] button. The user is therefore capable of knowing a setting state of the synchro mode regardless of the shutter speed setting mode.

A different point from FIG. 5 is that step #250 is additionally interposed between the start and step #51. In step #250, when the button flag is 1, the action moves to step #52. When the button flag is 0, the action moves to step #51.

FIG. 11 shows a third variant embodiment of the subroutine associated with synchro mode setting of FIG. 4. In accordance with this third variant embodiment, when the exposure control mode in the initial state is the P or A mode, and even when being set to the slow synchro mode, the slow synchro mode automatically changes to the normal synchro mode by switching over the exposure control mode to the S or M mode. Hence, in this third variant embodiment, when the exposure control mode is switched over to the S or M mode, the slow synchro flag is always reset, thereby improving the usability.

A different point from FIG. 4 is that steps #332 through #336 are added to a flow of action from step #31 to step #33. In step #31, the synchro mode changeover switch SW3 is turned off by releasing the depression of the unillustrated [SLW ↱] button. At this time, the action moves to step #332. In step #332, if the exposure control mode is the S or M mode, the action moves to step #336. If not, the action moves to step

33. In step #336, the slow synchro setting flag is reset, and the action moves to step #33.

According to one aspect of the present invention, if the exposure control mode comes under the shutter speed auto setting mode, the slow synchro indication is given by the indication controller when shifting the synchro mode setting member to a slow synchro mode setting position. If the exposure control mode comes under the shutter speed manual setting mode, no synchro indication is given even when shifting the synchro mode setting member to the slow synchro setting position. Therefore, even if the user tries to set the slow synchro mode during the shutter speed manual setting mode which is originally not limited in terms of shutter speed, no slow synchro indication is given. Hence, the user does not misunderstand at all.

According to another aspect of the present invention, the synchro mode controller permits a switchober to the slow synchro mode corresponding to the manipulation of the synchro mode changeover device during the shutter speed auto setting mode. During the shutter speed manual setting mode, the synchro mode controller inhibits the switchover to the slow synchro mode corresponding to the manipulation of the synchro mode changeover device. A meaningless switchover to the synchro mode is thus inhibited. It is therefore feasible to make the manipulation of the synchro mode changeover device invalid more surely than before.

According to still another aspect of the present invention, after the shutter speed setting mode changeover device has changed over the shutter speed auto setting mode to the shutter speed manual setting mode at the slow synchro mode setting time, the slow synchro mode is automatically switched over to the normal synchro mode by the synchro mode controller while interlocking therewith. With this arrangement, the normal synchro mode is always set when effecting the switchover from the shutter speed auto setting mode to the shutter speed manual setting mode. The operability is thereby ameliorated.

According to a further aspect of the present invention, the warning indicator gives a warning indication if the synchro mode changeover device is operated when the exposure control mode is set to the shutter speed manual setting mode. The user is therefore capable of recognizing that an insignificant operation is being performed.

Next, another embodiment of the present invention will be described. Explanations about the same components as those in the embodiments discussed above will be omitted.

Referring to FIG. 1, a switch SW6 is conceived as a switch interlocking with an [RE] button for setting to switch over the trailing curtain synchro mode and the leading curtain synchro mode. Every time the switch is turned on, the leading curtain and trailing curtain synchro modes are changed over.

Referring to FIG. 2, in step #11, the set routine is subjected to the subroutine call. A variety of parameters within the MCU 10 are thereby set corresponding to a state of the switch SW6 interlocking with the set device 13 and the [RE] button.

In step #27 of FIG. 3, the shutter controller 16 is driven to control the shutter according to a shutter speed obtained in step #13 of FIG. 2. In the meantime, the synchro switch SW5 is continuously monitored. Generated is a synchro output corresponding to the synchro mode set in step #13. The flash apparatus 20 is thereby controlled.

The following is an explanation of the set routine in step #11 of FIG. 2 in conjunction with FIG. 12.

FIG. 12 is a flowchart, which is a part of the flowchart of the set routine where the subroutine call is effected from step #11 of FIG. 2, showing a subroutine associated with synchro mode setting. In step #431, whether the switch SW6 ([RE] button) is turned on or not is checked. If turned on, the action moves to step #438. Whereas if turned off, the action moves to step #432. In step #432, whether or not the switch SW3 ([SLW] button) is turned on is examined. If turned on, the action moves to step #434. Whereas if turned off, the action moves to step #433. In step #433, the button flag is set to 0, and the action is returned. The button flag is, as will be mentioned latter, set to 1 (step #441) after the synchro mode has been set by pushing either the [RE] button or the [SLW] button. The button flag is set to 0 when both of the buttons are not depressed. More specifically, the button flag effectuates setting only when the button changes from the off-state to the on-state. The button flag is provided not to change setting when being kept on. If the two buttons are simultaneously pushed, the button flag does not become 0, and hence setting remains unchanged. In step #434, whether the button flag is 1 or not is checked. If the flag is 1, the action is returned, while setting remains unchanged. If the flag is 0, the action moves to step #435. Examined in step #435 is whether or not slow synchro mode setting is effected after the slow synchro flag has been set. If set to the slow synchro mode, the action moves to step #436. Whereas if not, the action moves to step #437. In step #436, the trailing curtain synchro flag and the slow synchro flag are set. Effected is setting to the leading curtain synchro mode and the normal synchro mode. The action then moves to step #441.

In step #437, the trailing curtain synchro flag is reset, and the slow synchro flag is set. Performed is setting to the leading curtain synchro mode and the slow synchro mode. The action then goes to step #441.

In step #438, whether the button flag is 1 or not is checked. If the flag is 1, the action is returned, while setting remains as it is. If the flag is 0, the action goes to step #439. Examined in step #439 is whether or not the trailing curtain synchro mode is set after the trailing curtain synchro flag has been set. If set to the trailing curtain synchro mode, the action moves to step #437. If not, the action moves to step #440.

In step #440, the trailing curtain synchro flag and the slow synchro flag are set. Setting to the trailing curtain synchro mode and the slow synchro mode is carried out, and the action goes to step #441.

After performing the processes of steps #436, #437 and #440, the button flag is set to 1 in step #441. The action is then returned.

As discussed above, the action moves to step #436. Setting to the leading curtain/normal synchro mode is effected therein only when pushing the [SLW] button in the case of being set to the slow synchro mode irrespective of the trailing curtain/leading curtain synchro mode.

The action goes to step #440. The trailing curtain/slow synchro mode is set only when pushing the [RE] button in the case of being set to the leading curtain synchro regardless of the normal/slow synchro mode.

Then, the action goes to step #437, wherein the leading curtain/slow synchro mode is set in two ways. One way is that setting is carried out just when pushing the [SLW] button in the case of being set to the leading/normal synchro mode. Another way is that setting is effected just when pushing the [RE] button in the case of being set to the trailing curtain/slow synchro mode.

Next, a state transition of the synchro mode will be explained with reference to FIG. 13.

Figure 13:
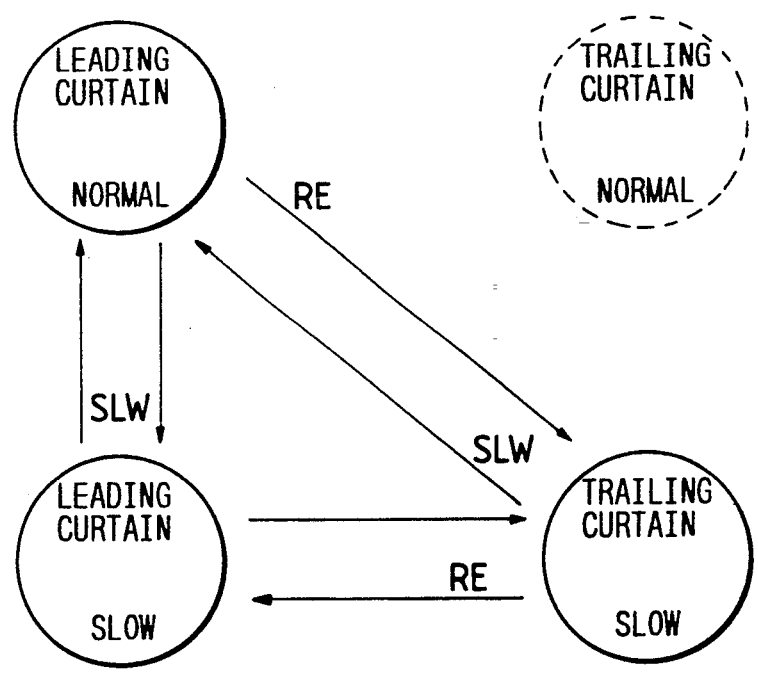
FIG. 13 is a diagram showing state transition of the synchro mode.

FIG. 13 is a diagram showing a state transition of the synchro mode which is determined by the synchro mode setting routine of FIG. 12.

During the leading curtain/normal synchro mode, when depressing the [RE] button, as in the flowchart of FIG. 12, the action moves like this: step #431→step #438→step #439→step #440. Then, a trailing curtain/slow synchro mode comes.

During the leading curtain/normal synchro mode, when pushing the [SLW] button, the action goes like this: step #431→step #432→step #434→step #435→step #437. Then, a leading curtain/slow synchro mode comes.

During the leading curtain/slow synchro mode, when pushing the [RE] button, the action goes like this: step #431→step #438→step #439→step #440. Then, the trailing curtain/slow synchro mode comes.

During the leading curtain/slow synchro mode, when pushing the [SLW] button, the action goes like this: step #431→step #432→step #434→step #435→step #436. Then comes the leading curtain/normal synchro mode.

During the trailing curtain/slow synchro mode, when pushing the [RE] button, the action goes like this: step #431→step #438→step #439→step #437. Then comes the leading curtain/slow synchro mode.

During the trailing curtain/slow synchro mode, when pushing the [SLW] button, the action goes like this: step #431→step #432→step #434→step #435→step #436. Then, the leading curtain/normal synchro mode comes.

As demonstrated above, there exists no combination of a trailing curtain/normal synchro mode.

Timings during the shutter control will next be described referring to FIG. 14.

Figure 14:
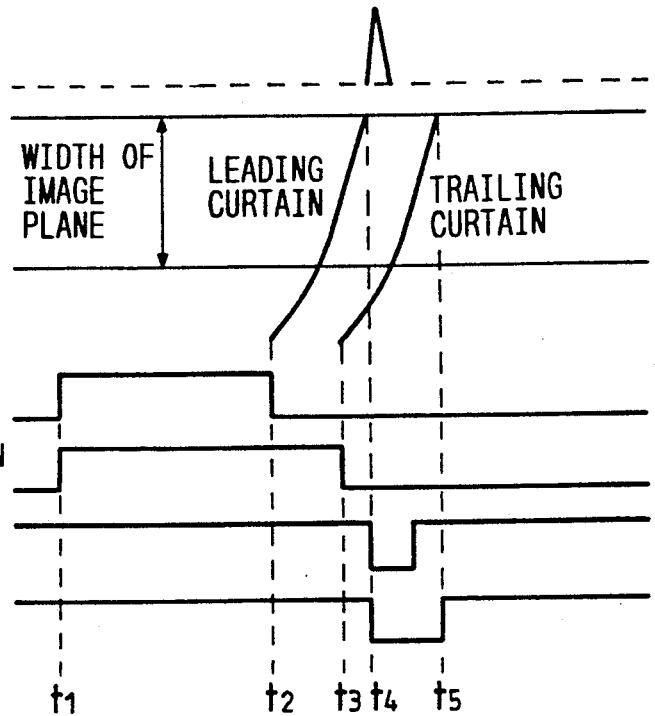

FIG. 14 is a timing chart showing timings during the shutter control, wherein the leading curtain synchro mode and the normal synchro mode are selected.

Referring to FIG. 14, the symbol (a) shows a flash waveform of the flash apparatus 20; (b) a shutter running curve; (c) a leading curtain control signal; (d) a trailing curtain control signal; (e) a waveform of the synchro switch SW5; and (f) a synchro output.

The MCU 10 enters a release sequence. In step #22 of FIG. 3, when energizing a shutter magnet (not shown), both of the leading curtain control signal (c) and the trailing curtain control signal (d) change from L to H at a timing t1.

Upon a completion of mirror-up, a shutter control routine is called in step #27 of FIG. 3. Then, the leading curtain control signal (c) is set at L at a timing t2, thereby permitting running of the leading curtain. Thereupon, as shown by the shutter running curve (b), just when the speed becomes constant from the onset of preparatory running of the leading curtain, the leading curtain reaches a photographing image plane. The actual leading curtain starts opening, and running of the leading curtain is completed at a timing t4.

The trailing curtain control signal (d) becomes L at a timing t3 after a shutter opening time to be controlled has elapsed from the timing t2. Holding of the shutter trailing curtain is released, and the trailing curtain starts running. Thereupon, the trailing curtain is, as in the same way with the leading curtain, reaches the photographing image plane just when the speed becomes, as indicated by the shutter running curve (b), constant from the onset of preparatory running of the tailing curtain. The actual trailing curtain starts closing, and running of the trailing curtain is completed at a timing t5.

The synchro switch SW5 is, as shown by (e), turned on at the leading curtain running completion timing (t4). The MCU 10 in the leading curtain synchro mode therefore sets the synchro output (f) at L just when detecting a turn-on of the synchro switch SW5. Then, the flash apparatus 20, as indicated by (a), starts flashing. If in a TTL light adjustment mode, a stop signal appears at the proper exposure timing. Flashing is stopped at that timing.

The synchro switch SW5 is turned off with running of the trailing curtain. The synchro output also comes H at the trailing curtain running timing (t5).

In the normal synchro mode, the shutter opening time is controlled within a range from a flash synchronizing second (1/250–1/125 [s]) to a speed (1/60–1/30 [s]) enough not to cause a hand deflection. Even if the subject is dark, the time is restricted to the second enough not to cause the hand deflections, with the result that a photo is based mainly on the flash light source of the flash apparatus 20.

Figure 15:
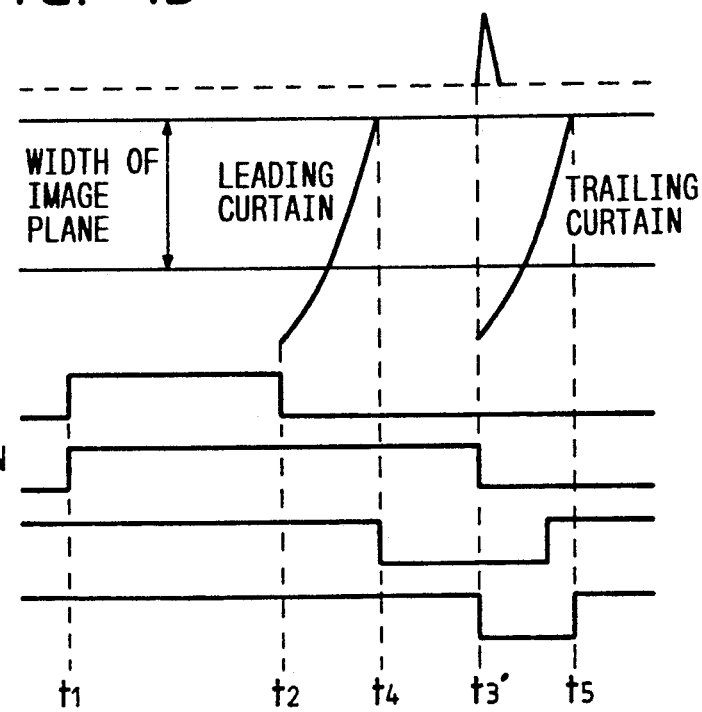

FIG. 15 is a timing chart showing timings during the shutter control, wherein the trailing curtain synchro mode and the slow synchro mode are selected.

Definitions of the waveforms (a) through (f) and the timings t1 through t5 in FIG. 15 are the same as those in FIG. 14.

Both of the leading curtain control signal (c) and the trailing curtain control signal (d) change from L to H at the timing t1. The leading curtain and the trailing curtain of the shutter are held.

The leading curtain starts running at the timing t2. Running of the leading curtain is completed at the timing t4. The synchro switch SW5 is, as indicated by (e), turned on at the leading curtain running completion timing (t4). In the case of the trailing curtain synchro mode, the MCU 10 makes the synchro output remain at H at that timing.

The trailing curtain starts running at a timing t3'. Running of the trailing curtain is completed at the timing t5.

The MCU 10, in the case of the trailing synchro mode, makes the synchro output (f) become L at the trailing curtain running start timing t3'. Then, the flash apparatus 20 starts flashing as shown by (a).

The synchro switch SW5 is turned off with running of the trailing curtain. The synchro output also becomes H at the trailing curtain running timing (t5).

In the slow synchro mode, the shutter opening time is controlled between the flash synchronizing second (1/250–1/125 [s]) and a normal shutter control range lower limit (1–30 [s]). If the subject is dark, the opening time is controlled under the second enough not to cause the hand deflection. Hence, it is possible to obtain a photo based not only on the flash light source of the flash apparatus 20 but also on the background light. In the case of being set to the trailing curtain synchro mode, a coming of the principal subject moving at the tip end of light trace can be captured by the flash light source.

As clarified from a comparison between FIGS. 14 and 15, if the shutter second is short even when being set to the trailing curtain synchro mode, the trailing curtain running timing is overlapped with the timing (t4) at which the synchro switch SW5 is turned on. Setting to the trailing curtain synchro mode therefore becomes ineffective.

FIG. 16 is a timing chart showing timings during the shutter control, wherein the leading curtain synchro mode and the slow synchro mode are selected.

Definitions of the waveforms (a) through (f) and the timings t1 through t5 in FIG. 16 are the same as those in FIG. 14.

Both of the leading curtain control signal (c) and the trailing curtain control signal (d) change from L to H at the timing t1. The leading curtain and the trailing curtain of the shutter are held.

The leading curtain starts running at the timing t2. Running of the leading curtain is completed at the timing t4. The synchro switch SW5 is, as indicated by (e), turned on at the leading curtain running completion timing (t4). The MCU 10 in the leading curtain synchro mode makes the synchro output become L at that timing. Thereupon, the flash apparatus 20 starts flashing as indicated by (a).

Subsequently, the trailing curtain starts running at the timing t3'. Running of the trailing curtain is completed at the timing t5.

The synchro switch SW5 is turned off with running of the trailing curtain. The synchro output also becomes H at the trailing curtain running timing (t5).

As discussed above, in accordance with the present invention, the synchro mode (slow synchro mode) having no restriction of the slow speed of second can be combined with the leading curtain synchro mode. The principal subject is captured by the flash immediately after a completion of leading curtain running upon making a release. An expression of the principal subject can be grasped well. If the principal subject is dark, the speed is controlled under the second enough not to cause the hand deflection. The camera is fixed by a tripod or the like so as not to produce the hand deflection. It is therefore possible to take a photo which sufficiently takes in not only the flash light source of the flash apparatus 20 but also the background light. If there is no attempt to exhibit a special effect, the leading curtain synchro mode has a wider range of usability even in the slow synchro mode.

Inhibited is a combination of the (normal synchro mode) having a restriction of the slow speed of second with the trailing curtain synchro mode. Hence, an inconvenience of taking a photo with no effect in the trailing curtain synchro mode is eliminated. Only the photo exhibiting the trailing curtain synchro effect can be taken.

On this occasion, the (slow synchro mode) with no restriction of the slow speed of second is always automatically set at the trailing curtain synchro mode selection setting time. It is possible to take a photo opportunity without failure.

Next, still another embodiment of the present invention will be described. Explanations about the same components as those in the embodiments discussed above will be omitted.

Referring to FIG. 1, the flash apparatus 20 incorporates a function to communicate serial data between the MCU 10 and the apparatus itself. This apparatus performs known clocked serial communications. Designated at L2 is a terminal for starting the data communications from the MCU 10. A terminal L3 is intended to transfer the serial clocks. A terminal L4 is intended to transfer the serial data. This terminal also serves as a terminal for a light emission stop signal from the light adjuster 11 by a timing deviation. This is a known technique disclosed in Japanese Patent Laid-Open Publication No. 1-295238.

A switch SW7 serves to set the trailing curtain synchro mode in the flash apparatus 20. The switch SW7 is turned on in the trailing curtain synchro mode but turned off in the leading curtain synchro mode.

Note that in this embodiment, the switch Sw3 is a switch interlocking with a [synchro] button for changing over the synchro mode. The switch SW3 is turned on by pushing the button but turned off upon a separation therefrom. Every time the switch SW3 is turned on, the synchro mode is switched over. Even when continuously pushing the button, setting remains unchanged.

FIG. 17 is a flowchart of the main routine of the MCU 10. In FIG. 17, step #10 of a communication routine is provided before the setting routine of step #11 in the flowchart of FIG. 2.

In step #10, the communication routine undergoes a subroutine call to effect the serial data communications with the flash apparatus 20. The data shown in Table 2 are obtained from the flash apparatus 20. The data are, if necessary, transferable from the MCU 10 to the flash apparatus 20.

TABLE 2

| | | Contents of Data |
|---|---|---|
| First Byte | Bit 0 | 1 (Complete Charge) |
| | | 0 (Uncompleted Charge) |
| | Bit 1 | 1 (No Set Member of Trailing Curtain) |
| | | 0 (There Is A Set member of Trailing Curtain) |
| | Bit 2 | 1 (Trailing Curtain Synchro) |
| | | 0 (Leading Curtain Synchro) |
| Second Byte | | |
| Third Byte | | |

The first byte communication data is defined as bit data transferred from the flash apparatus 20 to the MCU 10.

Bit 0 is a complete charge flag. When bit 0 is 1, this implies a complete charge state. When bit 0 is 0, this implies an uncompleted charge state.

Bit 1 is a flag indicating a presence and an absence of a trailing synchro mode setting member on the side of the flash apparatus. When bit 1 is 1, this implies an existence of a set member. When bit 1 is 0, this implies a non-existence of the set member.

Bit 2 is a flag for indicating, when a trailing curtain synchro mode set member is provided on the side of the flash apparatus, whether its setting is the trailing curtain synchro mode or not. When bit 2 is 1, this implies that the trailing synchro mode is set by the set member. When bit 2 is 0, this implies that the trailing synchro mode is not set by the set member (a leading curtain synchro mode is set).

A variety of information can be added to the bit data and the data of the second and subsequent bytes. However, this is not the gist of the present invention and is therefore omitted.

Incidentally, if no flash apparatus is mounted, or if the flash apparatus having no communicating function is mounted, the communications are not established. In this case, RAM regions of the MCU 10 which store the data of the Table 1 are all 0.

Note that the interrupt is permitted in step #15, and the action returns to step #10 to repeat the processes.

FIG. 18 is a flowchart, which is a part of the set routine in which the subroutine call is effected from step #11, showing a subroutine associated with setting of the synchro mode.

In step #531, on/off states of the switch SW3 are checked. Whether the [synchro] button is depressed or not is examined. When the [synchro] button is not pushed, and if in the off-state, the action moves to step #544. When the [synchro] button is pushed, and if in the on-state, the action goes to step #532.

In step #532, whether the button flag is 1 or 0 is checked. If the flag is 1, the action is returned, and setting remains unchanged. If the flag is 0, the action moves to step #533.

In step #533, whether or not the flash apparatus including the trailing curtain synchro set member is mounted is checked. Namely, when establishing the communications with the flash apparatus in step #10 of FIG. 17, the judgment is made depending on whether bit 1 of the first byte communication data shown in Table 2 is 1 or 0. When bit 1 is 1, the action goes to step #536. When bit 1 is 0, the action moves to step #534. If no flash apparatus is mounted, and if the flash apparatus, though mounted, has no communicating function, bit 1 becomes 0. Then, the action goes to step #534.

In step #534, whether the trailing curtain synchro flag is 1 or 0 is checked. Whether or not the trailing curtain synchro mode is set is examined. If the trailing synchro flag is 1, and when the trailing curtain synchro mode is set, the action goes to step #537. If the trailing curtain synchro flag is 0, and when the leading curtain synchro mode is set, the action goes to step #535.

In step #535, whether the slow synchro flag is 1 or 0 is checked. Examined also is whether the slow synchro mode is set or not. If the slow synchro flag is 1, and when the slow synchro mode is set, the action moves to step #539. If the slow synchro flag is 0, and when the normal synchro mode is set, the action goes to step #540.

The slow synchro mode herein is a mode wherein the shutter speed is not restricted at the hand deflection time of second. The normal synchro mode is a mode wherein the shutter speed is restricted at the hand deflection time of second. When the flash apparatus is mounted, photographing is effected constantly at a shutter speed (1/60 [s]) enough not to cause the hand deflection, although the subject luminance is low. Even when the background is darkened, the principal subject is clearly photographed without causing the hand deflection. The slow synchro is a mode wherein an exposure is applied to the background, and besides the exposure is given so that the principal subject is finely photographed. This mode may, however, induce the hand deflection.

In step #536, whether bit 2 of the first byte communication data from the flash apparatus 20 is 1 or 0 is checked. Examined also is whether the flash apparatus 20 is set to the trailing curtain synchro mode or not. If bit 2 becomes 1, and when being set to the trailing curtain synchro mode, the action goes to step #539. If the bit 2 is 0, and when being set to the leading curtain synchro mode, the action moves to step #541.

In step #537, the trailing curtain synchro flag is reset, and leading curtain synchro setting is effected. Then, the action moves to step #538.

In step #538, the slow synchro flag is reset, and normal synchro mode is set. Then, action goes to step #543.

In step #539, the trailing curtain synchro flag is set, and the trailing curtain synchro mode is set. Then, action moves to step #543.

In step #540, slow synchro flag is set, and the slow synchro mode is set. The action moves to step #543.

In step #541, the trailing curtain synchro flag is reset, and the leading curtain synchro mode is set. The action goes to step #542.

In step #542, whether the slow synchro flag is 1 or 0 is checked. Examined also is whether the slow synchro mode is set or not. If the slow synchro flag is 1, and when being set to the slow synchro mode, the action goes to step #538. If the slow synchro flag is 0, and when being set to the normal synchro mode, the action moves to step #540.

After performing the process is step #538 or #540, the button flag becomes 1 in step #543, and the action is returned.

In step #544, the button flag becomes 0, and the action is returned.

The button flag, as described above, becomes 1 after pushing the [synchro] button and becomes 0 when the button is not pushed. When the button continues to be pushed, the action is returned from step #532. Namely, the button flag is effective only when the button changes from the off-state to the on-state. The button flag also serves not to change setting when the button remains in the on-state.

Figure 19A:
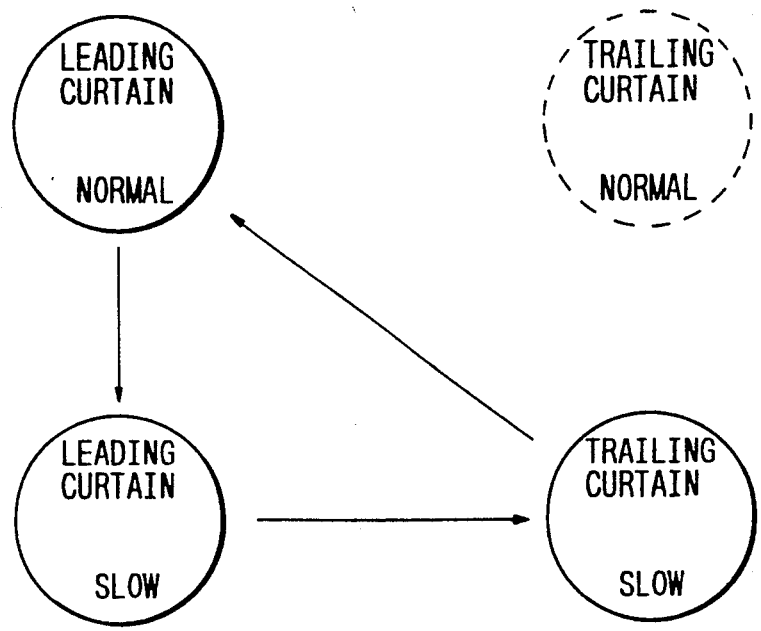
FIGS. 19A-19C are diagrams illustrating state transitions of the synchro mode.
Figure 19B:
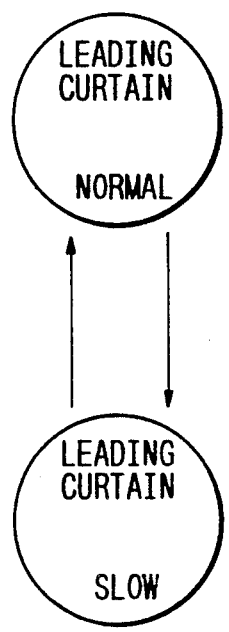
Figure 19C:

FIGS. 19A through 19C are diagrams each showing a state transition of the synchro mode which is determined by the synchro mode setting routine of FIG. 18.

FIG. 19A is a diagram showing the state transition when the flash apparatus incorporating the communicating function is not mounted.

When pushing the [synchro] button, in the flowchart of FIG. 18, the action goes like this: step #531→step #532→step #533. In step #533, if the flash apparatus having the communicating function is not mounted, bit 1 of the first byte in the memory for storing the communication data from the flash apparatus is 0, and the action goes to step #534.

During the leading curtain/normal synchro mode, when the [synchro] button is depressed, the action goes like this: step #534→step #535→step #540. In step #540, only the slow synchro flag is set. Then comes the leading curtain/slow synchro mode.

During the leading curtain/slow synchro mode, when pushing the [synchro] button, the action moves in this way: step #534→step #535→step #539→step #540. Both of the trailing curtain synchro flag and the slow synchro flag are set. Then, the trailing curtain/slow synchro mode comes.

During the trailing curtain/slow synchro mode, when pushing the [synchro] button, the action moves in this way: step #534→step #537→step #538. Both of the trailing curtain synchro flag and the slow synchro flag are reset. Then, the leading curtain/normal synchro mode comes.

More specifically, whenever the [synchro] button is pushed, the mode is changed over like this: the leading curtain/normal synchro mode→leading curtain/slow synchro mode→trailing curtain/slow synchro mode.

When the [synchro] button is depressed once again, the mode returns to the leading curtain/normal synchro mode. As discussed above, there exists no combination of the trailing curtain/normal synchro mode.

A reason why the trailing curtain synchro mode is effective will be elucidated as follows. While a light trace of the moving subject is photographed at the slow speed of second, and when closing the trailing curtain, the principal subject is photographed with an adequate exposure by a flash of the flash apparatus. As a result, the light, it appears, flows behind the principal subject, whereby a natural photo is obtained. Hence the trailing curtain synchro becomes effective when photographing is carried out at the slow speed of second. If set to the normal synchro mode, and when being restricted at the hand deflection time of second, no effect of the trailing curtain synchro is exhibited. Hence, the combination of the normal synchro mode with the trailing curtain synchro mode is inhibited.

FIG. 19B is a diagram showing the state transition, wherein the flash apparatus incorporating the communicating function is mounted, and the leading curtain synchro is set on the side of the flash apparatus.

When pushing the [synchro] button, in the flowchart of FIG. 18, the action moves like this: step #531→step #532→step #533. In step #533, when the flash apparatus having the communicating function is mounted, bit 1 of the first byte of the memory for storing the communication data from the flash apparatus 20 becomes 1, and the action goes to step #536.

In step #536, setting on the side of the flash apparatus is examined by bit 2 of the first byte communication data. In the case of being set to the leading curtain synchro on the side of the flash apparatus, bit 2 is 0, and the action always moves to step #541. The trailing curtain synchro flag is reset on the camera side, and leading curtain synchro setting is done. Then, the action goes to step #542.

During the leading curtain/normal synchro mode, when the [synchro] button is depressed, the action goes in this way: step #542→step #540. In step #540, slow synchro setting is effected, whereby the leading curtain/slow synchro mode comes.

During the leading curtain/slow synchro mode, when pushing the [synchro] button, the action moves like this: step #542→step #538. In step #538, the slow synchro flag is reset, and the leading curtain/normal synchro mode comes.

Namely, every time [synchro] button is depressed, the normal synchro mode and the slow synchro mode are switched over. Invariably, however, setting to the leading curtain synchro remains as it is due to setting of the flash apparatus 20.

FIG. 19C is a diagram showing the state transition, wherein the flash apparatus incorporating the communicating function is mounted, and the trailing curtain synchro is set on the side of the flash apparatus.

When pushing the [synchro] button, in the flowchart of FIG. 18, the action, as in the same way with FIG. 19B, goes like this: step #531→step #532→step #533→step #536.

In step #536, setting on the side of the flash apparatus is checked by bit 2 of the first byte communication data. If the trailing curtain synchro is set on the side of the flash apparatus, bit 2 becomes 1, and hence the action always goes to step #539. The trailing synchro flag is set. The action further moves to step #540. Subsequently, the slow synchro flag is set.

Namely, even when pushing the [synchro] button, the trailing curtain/slow synchro mode always comes, and the status can not be varied. This is, as described in FIG. 19A, a measure to make the trailing synchro setting effective.

Figure 20:
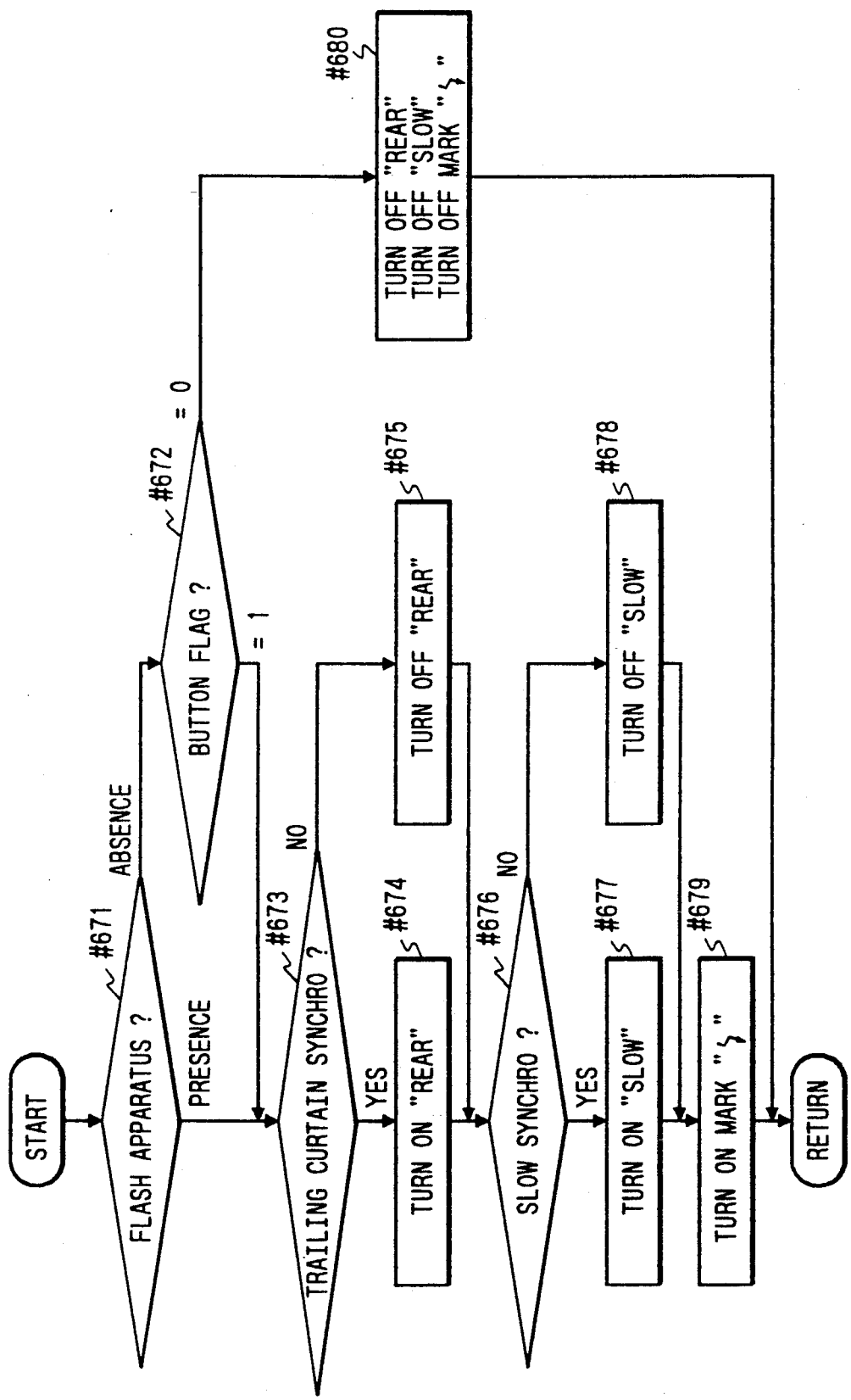
FIG. 20 is a flowchart of a subroutine associated with indication of the synchro mode.

FIG. 20 shows a subroutine which is a part of the indication routine of step #14 of FIG. 17 and is associated with the indication of the synchro mode.

In step #671, an existence or non-existence of the flash apparatus is examined. If the flash apparatus is provided, the action moves to step #673. Whereas if not, the action goes to step #672. At this moment, if the serial data communications of step #10 are established, the action, as a matter of course, goes to step #673.

However, even if the serial data communications are not established, and when mounting of the flash apparatus can be judged based on the level decision of the communication line, the action also moves to step #673.

The action goes from step #671 to step #672 when the flash apparatus is not mounted. In step #672, whether the button flag is 1 or 0 is checked. If the flag is 1, the action moves to step #673. If the flag is 0, the action goes to step #680. That is, even if the flash apparatus is not mounted, the action moves to step #673 in a state where the [synchro] button is depressed.

In step #673, whether the trailing curtain synchro flag is 1 or 0 is checked. If the trailing curtain synchro flag is 1, the action moves to step #674, wherein a [REAR] indication is turned on. If the trailing curtain synchro flag is 0, the action goes to step #675, wherein the [REAR] indication is turned off.

After performing the process of step #674 or #675, the action moves to step #676. In step #676, whether the slow synchro flags is 1 or 0 is examined. If the slow synchro flag is 1, the action goes to step #677, wherein a [SLOW] indication is turned on. If the slow synchro flag is 0, the action goes to step #678, wherein the [SLOW] indication is turned off.

After effecting the process of step #677 or #678, the action moves to step #679. In step #679, a [ ↯ ] mark is turned on, and the action is returned.

On the other hand, in step #680, [REAR], [SLOW] and [ ↯ ] mark are turned off. The action is returned.

FIGS. 21A through 21D show one example of the indicator 14 in which the indication is based on the indication routine.

Figure 21A:
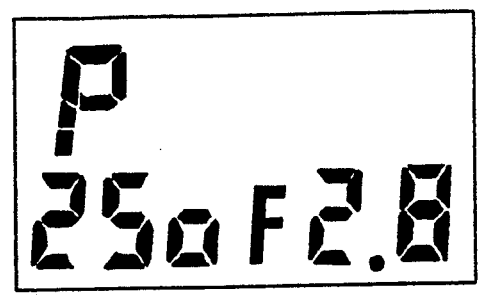
FIGS. 21A-21D are diagrams showing examples of indication.

FIG. 21A illustrates an indication in such a case that the flash apparatus is not mounted, and besides the [synchro] button is not pushed. In the flow of action of FIG. 20, the action goes to like this: step #671→step #672→step #680. Unlike FIGS. 21B, 21C and 21D, [SLOW], [REAR] and the [ ↯ ] indication are all turned off.

Figure 21B:
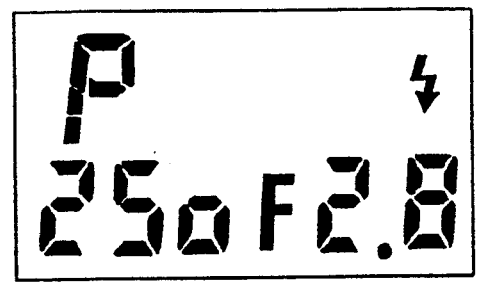
Figure 21C:
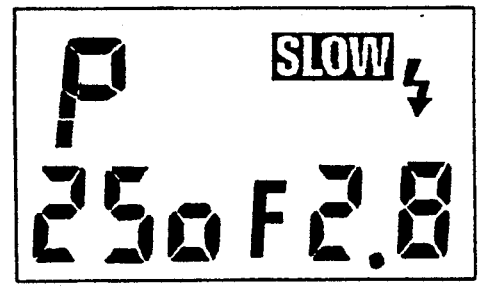
Figure 21D:
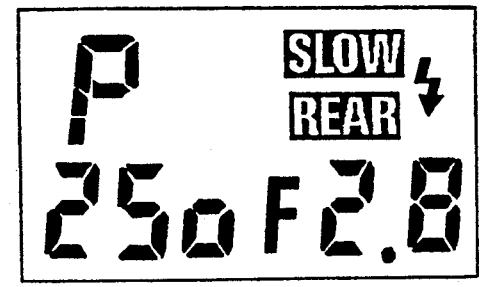

FIGS. 21B, 21C and 21D show indications when the flash apparatus is mounted, or alternatively the [synchro] button is pushed. Under the [leading curtain/normal synchro mode], in the flow of action of FIG. 20, the action goes in this way: step #671→(step #672)→step #673→step #675→step #676→step #678→step #679. The indications are given as illustrated in FIG. 21B. The [SLOW] and [REAR] indications are brought into the off-state, while the [ ↯ ] indication is put into the on-state. The trailing curtain synchro flag is reset, and the slow synchro flag is set. Under the [leading curtain/slow synchro mode], in the flow of action of FIG. 20, the action goes like this: step #671 (→step #672)→step #673→step #675→step #676—step #677—step #679. The indications are given as shown in FIG. 21C. The [REAR] indication is turned off, whereas the [SLOW] and [ ↵ ] indications are turned on.

Under the [trailing curtain/slow synchro mode] where both of the trailing curtain synchro flag and the slow synchro flag are set, in the flow of action in FIG. 20, the action moves like this: step #671 (→step #672)→step #673→step #674→step #676→step #677→step #679. The indications are given as illustrated in FIG. 21D. All the [SLOW], [REAR] and [ ↵ ] indications are put into the on-state.

The state transitions shown in the diagrams of FIGS. 19A–19C, which are associated with setting of the synchro mode by use of the [synchro] button, do not become effective till they are combined with the indications of FIGS. 21A–21D. Three modes therein correspond to the indications of FIG. 21B, 21C and 21D. In contrast with this, the indication of FIG. 21A does not correspond to any of them. The reason for this is that the indications of FIGS. 21B, 21C and 21D are not required till the flash apparatus is mounted or the synchro mode is set or rather troublesome in cases other than the above-mentioned.

FIGS. 14, 15 and 16 are timing charts showing timings during the shutter control.

In the slow synchro mode, a shutter opening time is controlled between a flash synchronizing time of second and a lower limit of the ordinary shutter control range. If the subject is dark, the opening time is controlled under the second enough not to cause the hand deflection. It is possible to obtain a photo which is based not only on the flash light source of the flash apparatus 20 but also on the background light. In the case of being set to the leading curtain synchro mode, the principal subject can be captured by a flash at the moment of release. Hence, an expression of the principal subject can be grasped well in the leading curtain synchro mode.

According to the present invention, when the flash apparatus is not mounted, any one of the leading curtain synchro mode and the trailing curtain synchro mode is set. The synchro mode selection setting function of the camera is thereby utilized.

When the flash apparatus is mounted, the priority is given to the synchro mode set on the side of the flash apparatus rather than the synchro mode set on the side of the camera. Whatever the synchro mode set on the side of the camera may be, photographing can be easily performed without causing any troubles during the setting operation by the synchro mode set on the side of the flash apparatus.

Although the illustrative embodiments of the present invention have been described in detail with reference to the accompanying drawings, it is to be understood that the present invention is not limited to those embodiments. Various changes or modifications may be effected therein by one skilled in the art without departing from the scope or spirit of the invention.

We claim:

1. A camera comprising:
   a shutter speed setting mode changeover means for changing over a shutter speed manual setting mode capable of manually setting a shutter speed, and a shutter speed auto setting mode capable of setting the shutter speed on the basis of a luminance value of a subject;
   a synchro mode changeover means for changing over a normal synchro mode capable of setting the shutter speed within a range of shutter speeds all of which are faster than a predetermined shutter speed at which hand deflection camera-shake affects photographing and for actuating a flash apparatus to perform flash photographing, and a slow synchro mode capable of setting a shutter speed within a range of shutter speeds including shutter speeds slower than said predetermined shutter speed and for actuating said flash apparatus to perform flash photographing;
   an indication means for effecting a slow synchro indication for showing that said slow synchro mode is set by said synchro mode changeover means; and
   an indication control means for permitting said indication means to effect said indication when said shutter speed auto setting mode is set by said shutter speed setting mode changeover means and for inhibiting said indication means from effecting said indication when said shutter speed manual setting mode is set by said shutter speed setting mode changeover means.

2. The camera according to claim 1, further comprising a synchro mode control means for controlling an operation of said synchro mode changeover means, said synchro mode control means permitting a changeover to said slow synchro mode in accordance with an operation of said synchro mode changeover means during said shutter speed auto setting mode but inhbiting the changeover to said slow synchro mode in accordance with the operation of said synchro mode changeover means during said shutter speed manual setting mode.

3. The camera according to claim 2, wherein said synchro mode control means, when said shutter speed setting mode changeover means effects a changeover from said shutter speed auto setting mode to said shutter speed manual setting mode at the time of setting said slow synchro mode, automatically performs a changeover from said slow synchro mode to said normal synchro mode.

4. The camera according to claim 1, further comprising a warning indication means for giving a warning indication when said synchro mode changeover means is operated in said slow synchro mode during said shutter speed manual setting mode.

5. A camera comprising:
   a flash apparatus;
   a first setting means for setting either one of a first synchro mode capable of setting a shutter speed within a range of shutter speeds from a synchronizing shutter speed of said flash apparatus to a limit shutter speed faster than a predetermined shutter speed at which hand deflection camera-shake affects photographing, and a second synchro mode capable of setting a shutter speed within a range of shutter speeds from said synchronizing shutter speed to a shutter speed slower than said predetermined shutter speed;
   a second setting means for setting either one of a leading curtain synchro mode for emitting the light of said flash apparatus immediately after completion of a shutter leading curtain running and a trailing curtain synchro mode for emitting the light of said flash apparatus just before a shutter trailing curtain running; and
   an inhibition means for inhibiting simultaneous setting of said first synchro mode and said trailing curtain synchro mode.

6. The camera according to claim 5, wherein said first setting means automatically sets said second synchro mode when said trailing curtain synchro mode is set.

7. A camera comprising:

a mounting means for mounting a flash apparatus;

a first setting means for setting either one of a first synchro mode capable of setting a shutter speed within a range of shutter speeds from a synchronizing shutter speed of said flash apparatus to a limit shutter speed faster than a predetermined shutter speed at which hand deflection camera-shake affects photographing, and a second synchro mode capable of setting a shutter speed within a range of shutter speeds from said synchronizing shutter speed to a shutter speed slower than said predetermined shutter speed;

a second setting means for setting either one of a leading curtain synchro mode for emitting the light of said flash apparatus immediately after completion of a shutter leading curtain running and a trailing curtain synchro mode for emitting the light of said flash apparatus just before a shutter trailing curtain running; and an inhibition means for inhibiting simultaneous setting of said first synchro mode and said trailing curtain synchro mode.

8. The camera according to claim 7, wherein said first setting means automatically sets said second synchro mode when said trailing curtain synchro mode is set.

9. A camera comprising:

a mounting means for mounting a flash apparatus including a setting means for setting either one of a leading curtain synchro mode for emitting light immediately after completion of a shutter leading curtain running and a trailing curtain synchro mode for emitting light just before the completion of a shutter trailing curtain running;

a setting means for setting either one of said leading curtain synchro mode and said trailing curtain synchro mode;

a detection means for detecting mounting and non-mounting of said flash apparatus and a type of synchro mode set in said flash apparatus when said flash apparatus is mounted; and a control means for causing said camera to function in accordance with said synchro mode exclusively set in said flash apparatus when said detection means detects mounting of said flash apparatus.

10. An indicator of a camera, comprising:

a synchro mode setting manipulation member for setting either of a first synchro mode and a second synchro mode;

an indication means including a first indication element for indicating said first synchro mode and a second indication element for indicating said second synchro mode; and a control means for indicating said first indication element of said indication means when manipulating said synchro mode setting manipulation member on the occasion of setting said first synchro mode, turning off said first indication element of said indication means when the manipulation of said synchro mode setting manipulation member is thereafter released, indicating said first indication element and said second indication element of said indication means when said synchro mode setting manipulation member is manipulated on the occasion of setting said second synchro mode, and maintaining indications of said first indication element and said second indication element of said indication means when the manipulation of said synchro mode setting manipulation means is thereafter released.

* * * * *